(12) United States Patent
Carman et al.

(10) Patent No.: US 6,845,449 B1
(45) Date of Patent: Jan. 18, 2005

(54) SYSTEM AND METHOD FOR FAST NESTED MESSAGE AUTHENTICATION CODES AND ERROR CORRECTION CODES

(75) Inventors: David W. Carman, Glenwood, MD (US); Michael D. Heyman, Columbia, MD (US); Alan T. Sherman, Columbia, MD (US)

(73) Assignee: Networks Associates Technology, Inc., Santa Clara, CA (US)

( * ) Notice: Subject to any disclaimer, the term of this patent is extended or adjusted under 35 U.S.C. 154(b) by 837 days.

(21) Appl. No.: 09/621,056

(22) Filed: Jul. 21, 2000

Related U.S. Application Data

(60) Provisional application No. 60/145,216, filed on Jul. 23, 1999.

(51) Int. Cl.[7] .................................................. H04L 9/00
(52) U.S. Cl. ...................................... 713/170; 713/166
(58) Field of Search .................. 380/30, 229; 713/291, 713/166, 156, 160, 159, 161, 163, 169, 170, 175, 176; 709/203; 705/67; 714/49, 52

(56) References Cited

U.S. PATENT DOCUMENTS

| | | | |
|---|---|---|---|
| 5,724,428 A | 3/1998 | Rivest | |
| 5,835,600 A | 11/1998 | Rivest | |

OTHER PUBLICATIONS

Balenson et al., "Adaptive Cryptographically Synchronized Authentication", Revision 1.0 Dec. 7th, 1998.*

Bellare et al., "Keying Hash Functions for Message Authentication", Preliminary Version.*

M. Bellare, R. Canetti, and H. Krawczyk, "Keying Hash Functions for Message Authentication" in *Advances in Cryptology: Proceedings of CRYPTO '96*, LNCS 1190, N. Koblitz, ed., Springer–Verlag (1996), 1–15.

R. Canetti, J. Garay, G. Itkis, D. Micciancio, M. Naor, and B. Pinkas, "Multicast Security: A Taxonomy and Efficient Constructions" in *INFOCOM '99 Proceedings*, Mar. 1999.

P. Rogaway, "Design and Analysis of Message Authentication Codes," presented at the 1996 RSA Data Security Conference, Jan. 19, 1996.

P. Rogaway, "Bucket Hashing and its Appication to Fast Message Authentication,", J. of Cryptology, Oct. 13, 1997.

J. Touch, "Performance Analysis of MD5," proceedings of Sigcomm '95, Boston, MA.

Atomic–2 Fast Security, http://www.isi.edu/atomic2/security/, printed Jan. 15, 2001.

Cryptographic Technologies Adaptive Cryptographically Synchronized Authentication (ACSA), http://www.pgp.com/research/nailabs/cryptograph/adaptive–cryptographic.asp, printed Jan. 12, 2001.

D. Balenson, et al. , ACSA Kickoff Brief presented to DARPA in Sep. 11, 1998.

D. Balenson, et al., ACSA Presentation to the DARPA/ITO Next Generation Internet (NGI) Principal Investigator's (PI) Meeting held on Oct. 29, 1998.

(List continued on next page.)

*Primary Examiner*—Gregory Morse
*Assistant Examiner*—Thomas Ho
(74) *Attorney, Agent, or Firm*—Zilka-Kotab, PC; Christopher J. Hamaty

(57) ABSTRACT

A system and method for detecting and correcting errors using an authentication mechanism is described. In particular, a reversible inner function is used in a nested message authentication code configuration to provide both error detection and error correction in high performance applications.

21 Claims, 19 Drawing Sheets

OTHER PUBLICATIONS

D. Balenson, et al. ACSA Presentation to the XIWT Workshop on Information Assurance and Trustworthy Networks held Nov. 18, 1998.

D. Carmen, "Adaptively Trading Off Strength and Performance in Network Authentication," Presentation at the RSA Conference 2000 held Jan. 19, 2000.

D. Balenson, et al., ACSA Model and Analysis Document—Revision 1.0 delivered to DARPA on Dec. 7, 1998.

D. Carmen, et al., ACSA Prototype System Design Document, Revision 1.0, May 12, 1999.

D. Carmen, et al., ACSA Final Report delivered to DARPA on Dec. 6, 2000.

DARPA ITO Sponsored Research, 1998 Project SummAry, Adaptive Cryptographically Synchronized Authentication.

DARPA ITO Sponsored Research, 1999 Project Summary, Adaptive Cryptographically Synchronized Authentication.

J. Black, S. Halevi, H. Krawczyk, T. Krovetz, and P. Rogaway, "UMAC: Fast and Secure Message Authentication," Advances in Cryptology—CRYPTO '99, vol. 1666, Springer–Verlag, 1999, pp. 216–233.

J. Adcock, D. Balenson, D. Carman, M. Heyman, and A. Sherman, "Trading Off Strength and Performance in Network Authentication: Experience with the ACSA Project," DARPA Information Survivability Conference and Exposition, Jan. 25–27, 2000.

Department of Defense Security Institute, STU–III Handbook for Industry, Feb. 1997.

Commerce Business Daily, PSA#2134, Jul. 10, 1998.

R. Gennaro and P. Rohatgi, "How to Sign Digital Streams," In Proceedings of CRYPTO 97, pp. 180–197, Feb. 24, 1998, Santa Barbara, CA.

S. Halevi and H. Krawczyk, "MMH: Software message authentication in the Gbit/second rates," Fast Software Encryption, LNCS 1267, E. Biham, Ed., Springer–Verlag, 1997, pp. 172–189.

D. McGrew, "Optimal One–Time Signature Methods, " Trusted Information Systems Technical Report, Aug. 1997.

H. Krawczyk, "LFSR–Based Hashing and Authentication," In Proc. CRYPTO 94, Lecture Notes in Computer Science. Springer–Verlag, 1994.

Wegman, et al. "New Hash Functions and Their Use in Authentication and Set Equality," J Computer and System Services, (1981), 22:265–279.

Bellare et al., "Keying Hash Functions for Message Authentication", Preliminary Version.*

* cited by examiner

|  | Receiver Processor Utilization | | |
|---|---|---|---|
| Sender Processor Utilization | Too Heavily Loaded | Near Desired CPU Load | Lightly Loaded |
| Too Heavily Loaded | switch to less computationally intensive gear | switch to less computationally intensive gear | switch to less computationally intensive gear |
| Near Desired CPU Load | switch to less computationally intensive gear | maintain current gear | maintain current gear |
| Lightly Loaded | switch to less computationally intensive gear | maintain current gear | switch to more secure (more computationally intensive) gear |

FIG. 6

SYSTEM AND METHOD FOR FAST NESTED MESSAGE AUTHENTICATION CODES AND ERROR CORRECTION CODES

The present application claims priority to Provisional Application No. 60/145,216, filed Jul. 23, 1999, which is incorporated herein by reference in its entirety.

The invention was made with Government support under Contract F30602-98-C-0215 awarded by the Air Force. The Government has certain rights in this invention.

BACKGROUND

1. Field of the Invention

The present invention relates generally to authentication mechanisms, and more particularly, to systems and methods for adaptively trading off authentication strength and performance.

2. Discussion of the Related Art

Providing authentication, defined as connectionless integrity and data origin authentication, is essential to the security of networks. One method of providing authentication of a message is through use of a digital signature. Digital signatures are based on computationally intensive public key operations, thereby making them too slow for high-speed network use.

Faster authentication alternatives to digital signatures include message authentication codes (MAC) such as HMAC-SHA-1-96 and HMAC-MD5-96. Although HMAC-SHA-1-96 and HMAC-MD5-96 have been adopted as standards for popular security protocols such as Internet Protocol Security (IPsec), they still may be too slow for network applications such as real-time high-speed video, high-performance distributed computing, high-speed distributed storage, and 3-D virtual reality. Such applications might run on conventional platforms with high speed network devices (e.g. Gigabit Ethernet or ATM networks on Pentium class machines without cryptographic hardware), on special platforms with conventional cryptographic hardware, or on computationally-limited single-processor devices.

For large amounts of data, the speed of the HMAC-SHA-1-96 and HMAC-MD5-96 functions is determined by the underlying hash algorithms, SHA-1 and MD5, respectively. On a Pentium processor, SHA-1 and MD5 require approximately 53 and 21 clock cycles, respectively, per 32-bit data word processed. These clock-cycle values may seem quite reasonable for many applications, but are untenable for high-speed networks on CPU-limited platforms. Indeed, some estimates indicate that there could be at least a factor of 100 difference between conventional authentication speeds and that of ultra-fast networks. Thus, while cryptographic-based data-stream source authentication techniques provide high security, they can induce time delays that are unacceptable. What is needed therefore is a practical and flexible solution to high-speed network authentication that can be implemented in software and/or hardware.

SUMMARY OF THE INVENTION

The present invention meets the aforementioned needs by providing an authentication system that implements a strength-performance trade-off. The authentication system includes a controller that dynamically selects one of a plurality of authentication mechanisms to be used in providing authentication for an exchange of message data. The variation in the level of authentication assurance can be based on one or more factors such as the current security conditions and the available CPU utilization.

In another aspect of the present invention, a higher-speed, lower-strength authentication mechanism is provided. The higher-speed, lower-strength authentication mechanism is based on a nested message authentication code structure. In the nested message authentication code structure of the present invention, a plurality of faster-speed, lower-strength inner functions feed into a high-strength outer function. A scattering function is also provided that pseudorandomly selects which parts of the message should feed into which inner functions. With this structure, an adversary is prevented from knowing which parts of the message are processed by which inner functions.

In a further aspect of the present invention, an even higher-speed, lower-strength authentication mechanism is provided. This mechanism is based on a partial message authentication code, wherein a message authentication code is applied only to some portion of the message. By applying an authentication algorithm only to selected parts of the message, significant time can be saved while maintaining acceptable security.

In a still further aspect of the present invention, the plurality of authentication mechanisms can be used to generate a plurality of authentication tags for the same message. This plurality of authentication tags can reflect different authentication strength-performance levels. It is a feature of the present invention that a receiver is afforded increased flexibility in adaptively choosing strength-performance levels. It is a further feature of the present invention that multiple authentication tags can be used in multicast environments, where different receivers may have different processor capabilities or security policies.

In yet still a further aspect of the present, authentication mechanisms can be used for error detection as well as error correction. In one embodiment of the present invention, a reversible inner function can be used in a nested MAC configuration to provide both error detection and error correction in high performance applications.

BRIEF DESCRIPTION OF THE DRAWINGS

The foregoing and other features and advantages of the invention will be apparent from the following, more particular description of a preferred embodiment of the invention, as illustrated in the accompanying drawings.

FIG. 6 illustrates an authentication gear switching algorithm based upon CPU load levels.

DETAILED DESCRIPTION

A preferred embodiment of the invention is discussed in detail below. While specific implementations are discussed, it should be understood that this is done for illustration purposes only. A person skilled in the relevant art will recognize that other components and configurations may be used without departing from the spirit and scope of the invention.

Figure 1:
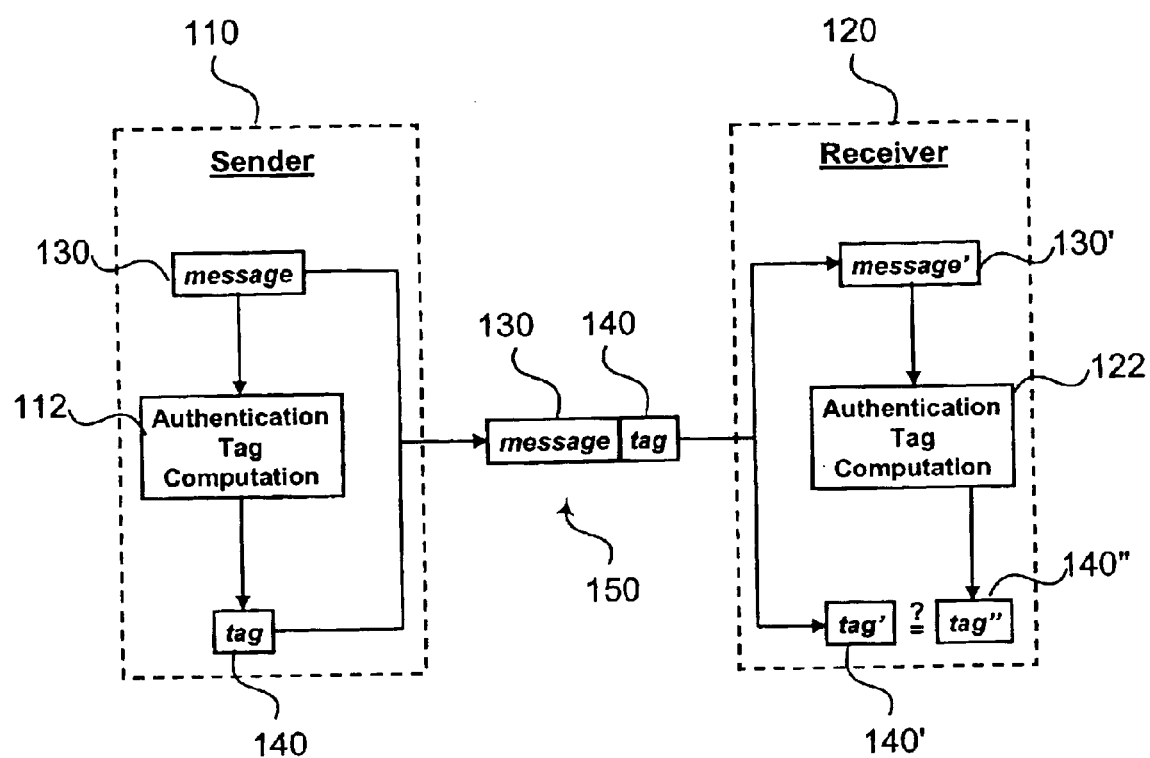
FIG. 1 illustrates a conventional network authentication process that appends an authentication tag to message data.

Authentication is an essential component to the security of networks. FIG. 1 illustrates a conventional authentication process involving a sender 10 and a receiver 120. In this authentication process, authentication tag computation module 112 of sender 110 generates an authentication tag 140 based upon message (or packet) 130. Sender 110 appends the generated authentication tag 140 to message 130 to produce a communication 150. Communication 150 is then transmitted to receiver 120.

Upon receipt of communication 150, receiver 120 extracts message 130' and authentication tag 140'. The extracted message 130' is used by authentication tag computation module 122 in receiver 120 to produce authentication tag 140". A comparison is then made to determine if the generated authentication tag 140" matches the extracted authentication tag 140'. If the authentication tags match, then message 130' is authenticated.

In conventional methods, the authentication process can be based on computationally intensive public key operations. These computationally intensive operations can make an authentication process too slow for high-speed network applications. Faster authentication methods are therefore required.

Figure 2:
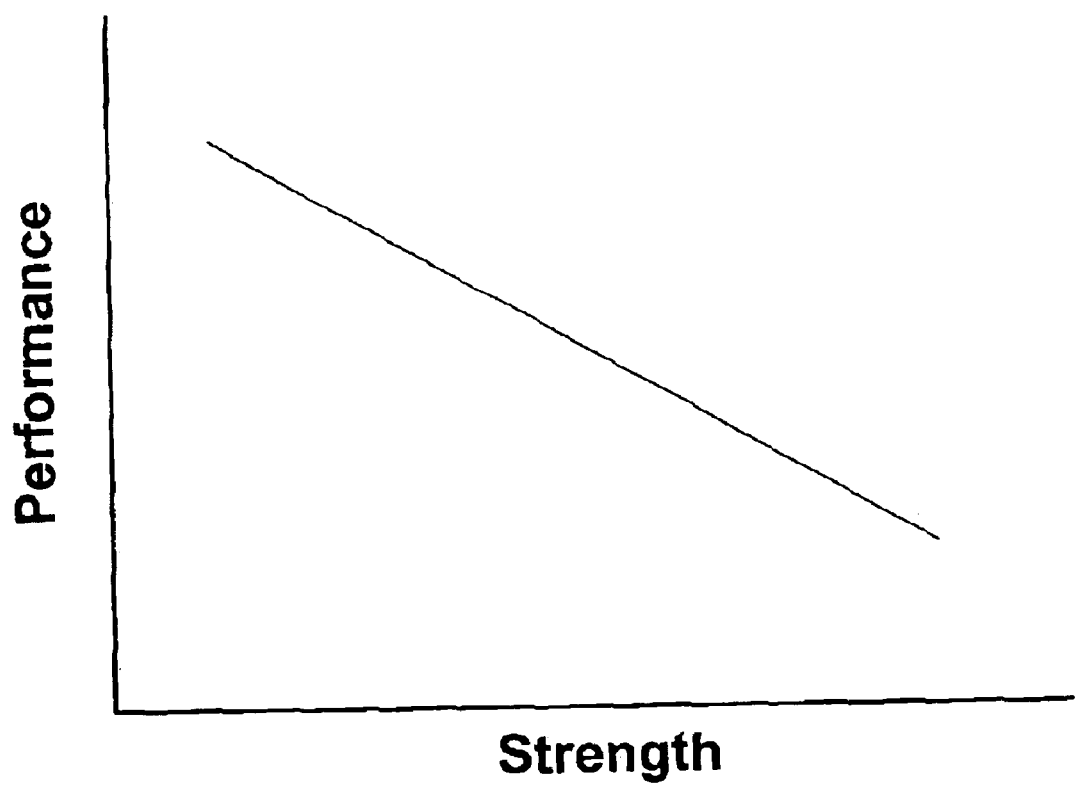
FIG. 2 illustrates a hypothetical strength-performance tradeoff curve for network authentication.

It is a feature of the present invention that faster authentication methods can be provided selectively by trading off authentication strength and performance. FIG. 2 illustrates a hypothetical strength-performance tradeoff curve for network authentication. This strength-performance tradeoff curve defines a series of strength-performance tradeoff levels that can be used by the authentication system. In this operational framework, a user can select a lower-speed, higher-strength authentication mechanism or a higher-speed, lower-strength authentication mechanism. As can be appreciated, various combinations of authentication strength-performance levels can be defined for a given authentication system.

In conventional approaches to network authentication, high authentication strength was paramount with speed existing as a secondary concern. In the present invention, however, it is recognized that not all applications require high-strength authentication. Faster authentication speeds can be achieved by accepting lower-strength (yet adequate) authentication methods. The authentication system of the present invention is therefore designed to adaptively adjust its authentication strength and speed to meet current needs based on considerations such as security policy, observed authentication error rates, alarms from host or network defenses, and processor loading.

In this framework, the various strength-performance levels can be envisioned as gears of an automobile transmission. Lower-speed authentication gears enable slower communication with higher security, while higher-speed authentication gears enable faster communication with lower security.

Figure 3:
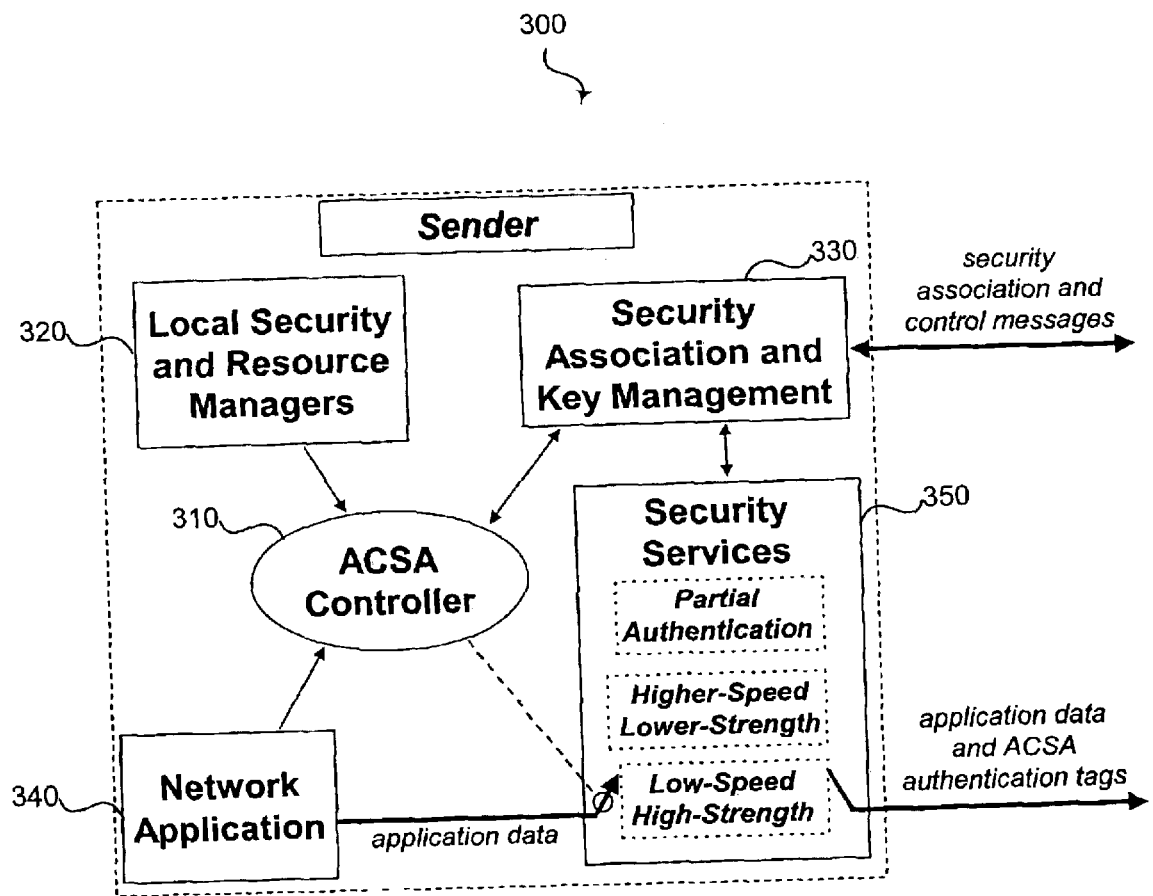
FIG. 3 illustrates an embodiment of an adaptive cryptographically synchronized authentication system having a controller that selects between a plurality of supported authentication mechanisms.

An embodiment of an adaptive cryptographically synchronized authentication (ACSA) system is illustrated in FIG. 3. The ACSA system 300 is organized into five major modules: ACSA controller 310, local security and resource managers 320, security association and key management 330, network application 340, and security services 350. FIG. 3 illustrates ACSA system 300 operating as a sender. As would be appreciated, a symmetrical organization of like components would also exist at an ACSA system operating as a receiver. In FIG. 3, the arrows represent the flow of application data and control information.

ACSA system 300 operates under the control of ACSA controller 310. ACSA controller 310 determines which authentication mechanism (or gear) should be used in providing authentication for data exchanged between nodes sharing a given security association (SA). Generally, a SA is a simplex (uni-directional) logical connection, created for security purposes. All network application data traversing a SA is provided the same security processing.

Local security and resource managers 320 represent components that may be provided by a host system. These components can be designed to provide information such as security and resource policy, processor load information, alarms from host or network defenses, or any other information relevant to selection of an authentication gear.

Security association and key management module 330 is designed to establish and maintain SAs and cryptographic keys between communicants. In one embodiment, security association and key management module 330 establishes and maintains a suite of SAs that correspond to the ACSA gears supported for a given connection. As further illustrated in FIG. 3, control messages are also communicated between the sender and receiver nodes via security association and key management module 330.

Security services module 350 performs the authentication tag computation for the gear specified by ACSA controller 310. When operating in receiver mode, security services module 350 also detects and reports received authentication errors to ACSA controller 310.

Various network authentication gears can be defined for an ACSA system 300. As would be appreciated, the number and variety of authentication gears to be supported is implementation dependent. As illustrated in the embodiment of FIG. 3, security services module 350 supports three groups of authentication mechanisms: low-speed, high-strength mechanisms, higher-speed, lower-strength mechanisms, and high-speed, low-strength mechanisms such as partial authentication mechanisms.

The low-speed, high-strength mechanisms can include conventional hash-based message authentication codes (HMACs) such as HMAC-SHA-1-96 and HMAC-MD5-96 algorithms.

The higher-speed, lower-strength mechanisms represent an intermediate class of authentication mechanisms that bridge the gap between low-speed, high-strength mechanisms and high-speed, low-strength mechanisms. Higher-speed, lower-strength mechanisms can include universal message authentication codes (UMACs). UMACs are based on a new universal family of hash functions that effectively exploit SIMD parallelism and run an order of magnitude faster than conventional mechanisms such as HMAC-SHA-1. UMACs are described in greater detail in Black et al., "UMAC: Fast and Secure Message Authentication," in *Advances in Cryptology: Proceedings of CRYPTO '99*, LNCS 1666, M. Wiener, ed., Springer-Verlag (1999), 216–233, which reference is incorporated herein by reference in its entirety.

Higher-speed, lower-strength mechanisms can also include MACs based on inner function groups (IFGs). The IFG MACs are described in greater detail below.

Finally, high-speed, lower-strength mechanisms can include partial message authentication codes (PMACs). PMACs represent a class of high-speed, low-strength authentication mechanisms that authenticate only a portion of a message. PMACs are also described in greater detail below.

Figure 10:
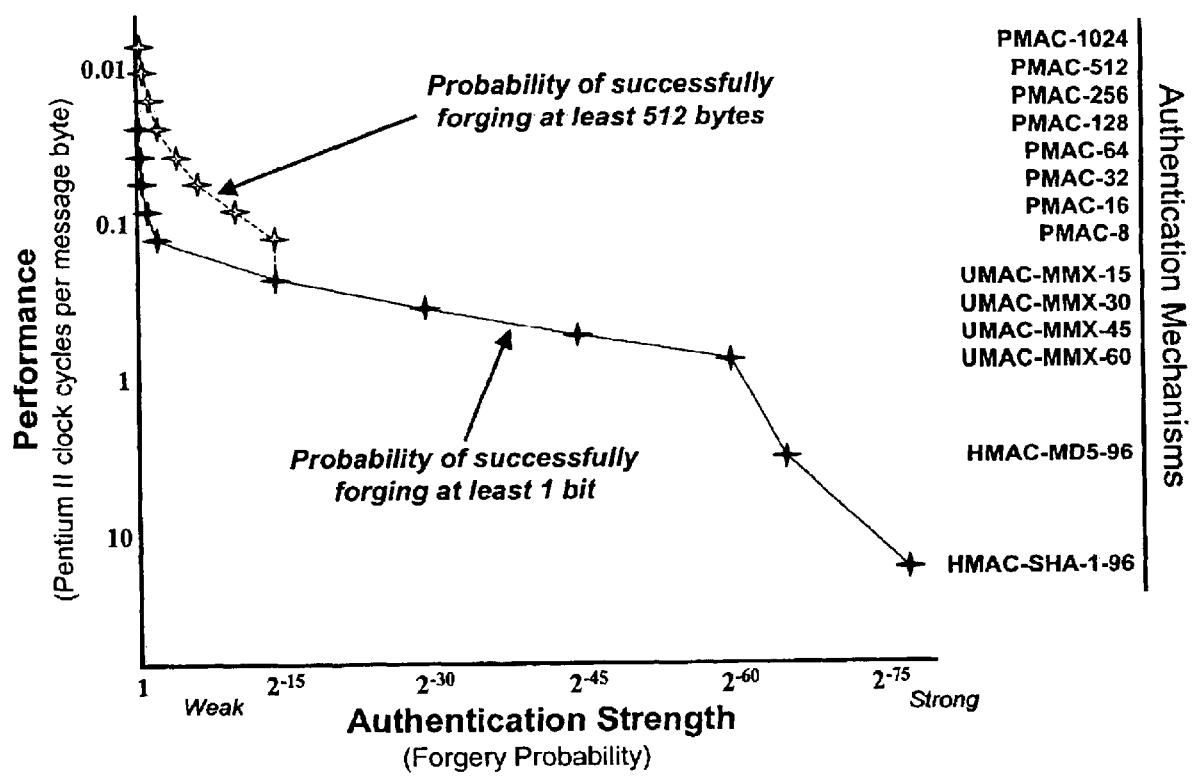
FIG. 10 illustrates a strength-performance tradeoff for network authentication gears in accordance with the preferred embodiment.

In a preferred embodiment, the HMAC, UMAC, and PMAC groups are further defined to produce the authentication gears illustrated in the authentication strength/performance plot of FIG. 10. As illustrated, the authentication gears are defined by the HMAC-SHA-1-96, HMAC-MD5-96, UMAC-SIMD-60, UMAC-SIMD-45, UMAC-SIMD-30, UMAC-SIMD-15, PMAC-8, PMAC-16, PMAC-32, PMAC-64, PMAC-128, PMAC-256, PMAC-512, and PMAC-1024 algorithms. This collection of algorithms defines a broad range of authentication strength and performance tradeoff levels that can be selectively chosen based upon the current operating environment.

As noted above, ACSA controller 310 determines which authentication mechanism (or gear) should be used in providing authentication for data exchanged between nodes sharing a given SA. In making this gear-selection decision, ACSA controller 310 relies on inputs from local security and resource managers 320 and from network application 340 (e.g., local network application policy). Additionally, when the ACSA system 300 is performing the sender role for a given connection, controller 310 may also receive inputs from the receiver via security association and key management module 330 regarding authentication errors and the receiver's processor load.

For each SA, ACSA system 300 functions as either the sender or the receiver. Similarly, for each SA, ACSA controller 310 also functions in the sender or receiver mode. In the sender mode, ACSA controller 310 initially determines the authentication gear, switches the authentication gear as necessary, and disseminates the authentication gear information to the receiver. In the receiver mode, ACSA controller 310 negotiates authentication gear information with the sender-mode ACSA controller 310 and sets the authentication gear as denoted by the sender-mode ACSA controller 310.

Figure 4:
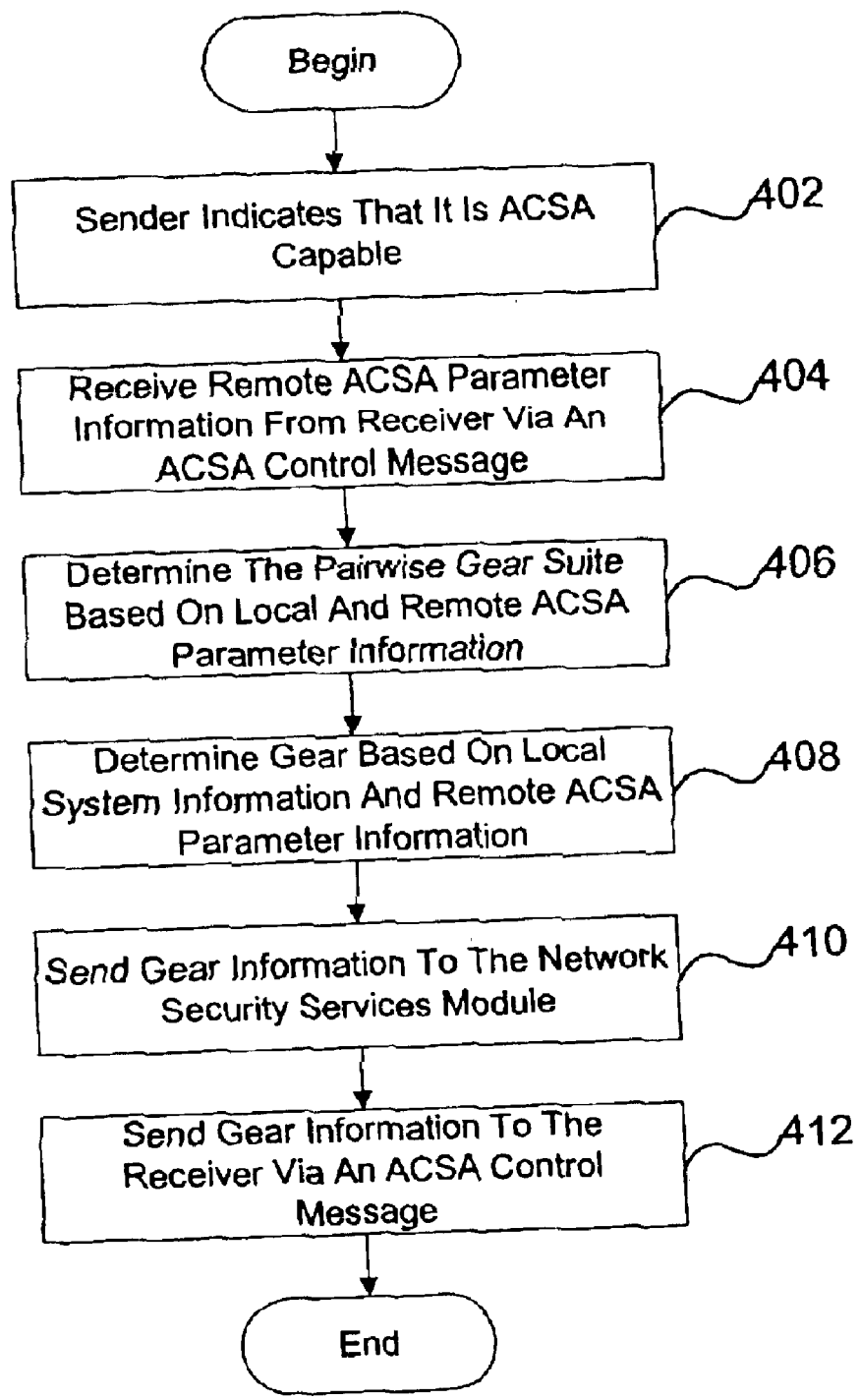
FIG. 4 illustrates a flowchart of an initial authentication gear determination process.

The initial authentication gear determination process is now described with reference to the flowchart illustrated in FIG. 4. The process begins at step 402 when the sender verifiably indicates that it is ACSA capable. This indication can occur via a digitally signed capability field, certificate extension, or some other verifiable attestation. Next, at step 404, the sender receives remote ACSA session and gear parameter information from the receiver via an ACSA control message.

In one embodiment, the ACSA session parameters include data word size, heartbeat interval, and gear suite parameters, while the ACSA gear parameters includes gear type and composition parameters.

The data word size parameter represents the data size a receiver network device CPU desires to move data. Typically, this parameter will be the machine size (i.e., Pentium-class=32; Alpha, Merced=64). The heartbeat interval parameter is a timeout interval during which an ACSA participant should expect to receive a control message from the remote party. The gear suite parameter is an enumeration of the authentication gears that the receiver wishes to support for this session. Although the network device may support a wide range of gears, some very it slow or very insecure gears may be excluded from the gear suite due to network and/or application policy, quality-of-service, and/or performance considerations.

The gear type parameter can be designed to represent the different groups of authentication mechanisms that are supported by security services module 350. In one example, the gear type parameter has either a "conventional," "MAC group," or "partial authentication" value. The composition parameter identifies the specific authentication mechanism within a particular group. For example, in the "MAC group" gear type, the composition parameter can be designed to identify the algorithm ID of an inner MAC function, any gear specific parameters for the inner MAC function, the percentage of data words which contribute to the inner MAC function, the algorithm ID of the outer MAC function, and any gear specific parameters for the outer MAC function.

After the sender receives the session and gear parameters from the receiver, the sender then proceeds, at step 406, to determine the pairwise gear suite based on local and remote ACSA parameter information. In this process, the sender compares its local session and gear parameters to the receiver's session and gear parameters and then determines the pairwise session and gear parameters. In an alternative embodiment, the sender is operative to initially send session and gear parameters to the receiver, with the receiver responding with some indication of the authentication gears that it supports.

In general, the pairwise session parameters can be determined as follows: (1) the pairwise data word size is selected as the larger of the receiver and sender's data word sizes, (2) the pairwise heartbeat interval is selected as the smaller of the receiver and sender's desired heartbeat intervals, (3) the pairwise gear suite is selected as the intersection of the receiver's gear suite and the sender's gear suite, wherein if the intersection is the null set, the ACSA operation cannot occur, and (4) the base gear is selected as the most secure (and slowest) gear of the pairwise gear suite, and the max gear is selected as the fastest (and least secure) gear of the pairwise gear suite.

Having determined the pairwise gear suite, the sender then proceeds, at step 408, to determine the initial authentication gear based on local system information and remote ACSA parameter information. In one example, the local system information is represented by the local security policy and the application performance/security policy. The local security policy includes a delineation of the minimal authentication security to be applied to all ACSA authentication operations. The application performance policy denotes the minimum performance/speed/rate/quality-of-service desired by application 340, while the application security policy denotes the minimum authentication security to be applied to ACSA authentication operations involving application 340, when this policy differs from that specified in the local security policy.

Other factors can also be considered in determining the initial gear. First, if the initial gear were always set to a well-known gear, an adversary would therefore have the advantage of knowing what gear to attack. If the well-known gear was very secure, the adversary's attack would be unsuccessful, but the performance impact of starting off in such a computationally intensive gear could cause problems on some network device platforms. Alternatively, if partial authentication were selected, an adversary would be able to take advantage of the fact that not all data words of a session's initial packets would contribute to the authentication tag calculation. Partial authentication is described in greater detail below in the description of the PMAC class of authentication mechanisms.

After the initial gear has been selected by the sender, ACSA controller 310, at step 410, sends the selected gear information to the security services module 350 so that the selected authentication gear can be applied to application data associated with the SA. Finally, at step 412, the sender sends the selected gear information to the receiver via an ACSA control message.

In steady state operation, packets are exchanged in accordance with the authentication operations defined for the negotiated authentication gear. During this time, heartbeat messages are sent from the receiver back to the sender periodically. The heartbeat messages may contain authentication error, CPU load information, missing packet information and desired gear information. Heartbeat messages provide a mechanism for the sender to confirm that the receiver is gear synchronized, and allows the sender to adapt the gear selection to the receiver's desire. Other ACSA control messages such as Authentication Error, Synchronization Error, and Gear Switch Request messages can also be sent from the receiver to the sender.

Figure 5:
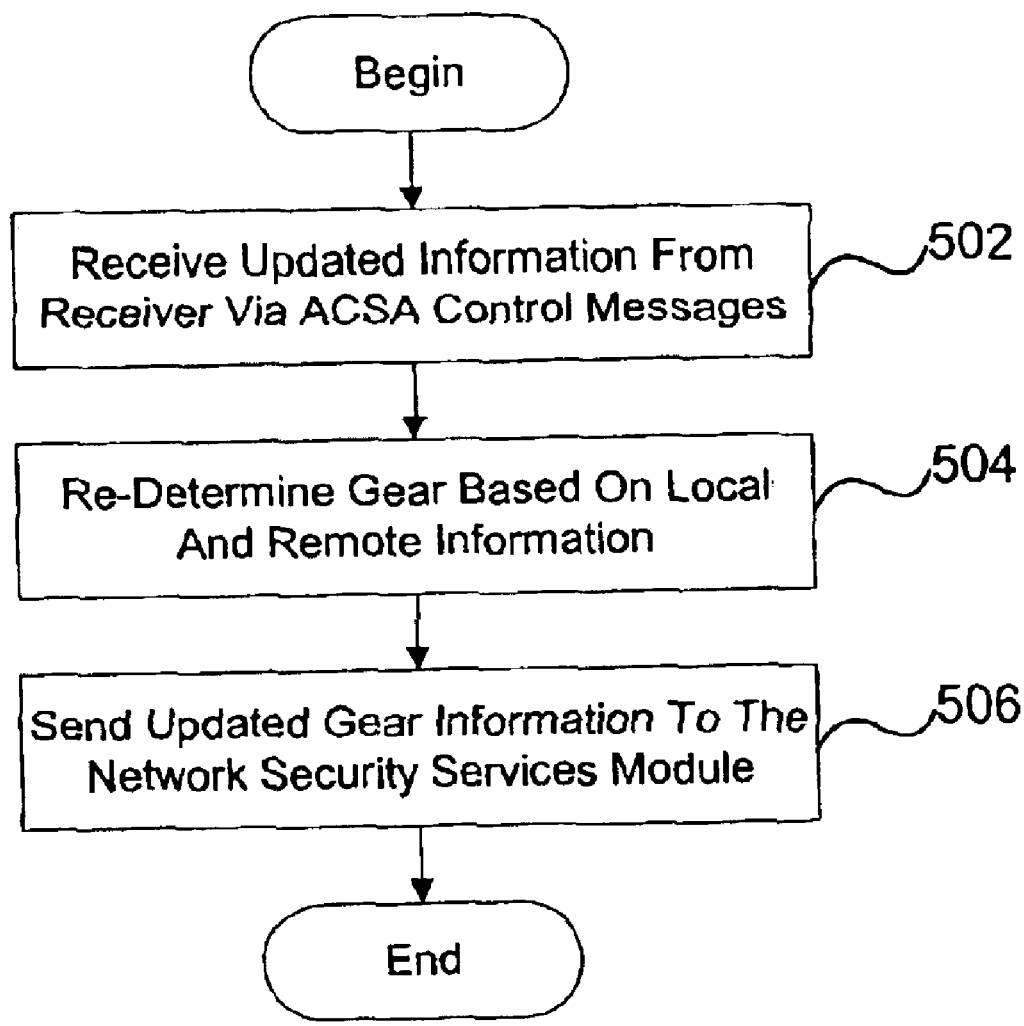
FIG. 5 illustrates a flowchart of an authentication gear switching process.

The process of authentication gear switching is illustrated in FIG. 5. The process begins at step 502, where the sender receives updated information from the receiver via ACSA control messages concerning authentication errors, CPU load, etc. Next, at step 504, the sender re-determines the authentication gear based on local and remote information. Finally, at step 506, the updated gear information is sent to the network security services module 350. In one embodiment, the updated gear information can also be sent to security association and key management module 330. In one example, a receiver could detect a condition that would require a gear change and notify the sender of the desired gear change. Alternatively, the sender could determine that an ACSA control message has not been received from the receiver within the heartbeat interval, that a local environment condition requiring a gear change has occurred, or that a periodic pseudorandom gear change is required.

As would be appreciated, a periodic pseudorandom changing of the authentication gear would (1) deter an adversary from determining the gear via long-term averaged information; (2) lessen the benefit to an adversary of compromising a gear since less data will be associated with it; and (3) gives the adversary less time to make use of a successful attack before the gear switches again.

In general, policy changes and alarms will seldom occur during a session. The CPU load represents one of the main environmental factors that will vary within the ACSA system during an ACSA session. Thus, the CPU load represents one of the main environmental factors that drives authentication gear switching. A basic gear switching algorithm operative in the absence of recent alarms or authentication errors is provided as illustrated in the state matrix diagram of FIG. 6.

As illustrated, the load of both the sender and receiver will dictate the necessity of an authentication gear change. In the example algorithm, authentication gear switching occurs in the following instances: (1) if either the sender or receiver processor is too heavily loaded, then a switch to a less computationally intensive gear is initiated; (2) if either the sender or receiver processor is near the desired load and the other processor is not too heavily loaded, then the current authentication gear is maintained; and (3) if both the sender and the receiver processor are lightly loaded, then a switch to a more computationally intensive gear is initiated.

As noted, alarms or authentication errors can also lead to an authentication gear switch. Generally, upon detection of either a local or remote alarm or authentication error, the sender may choose to switch to a more secure gear. Gear switching need not occur when a single alarm or error is detected, and depends upon local and application policy. Also, local alarms, remote alarms, and authentication errors may have different thresholds for causing a gear switch.

Figure 7A:
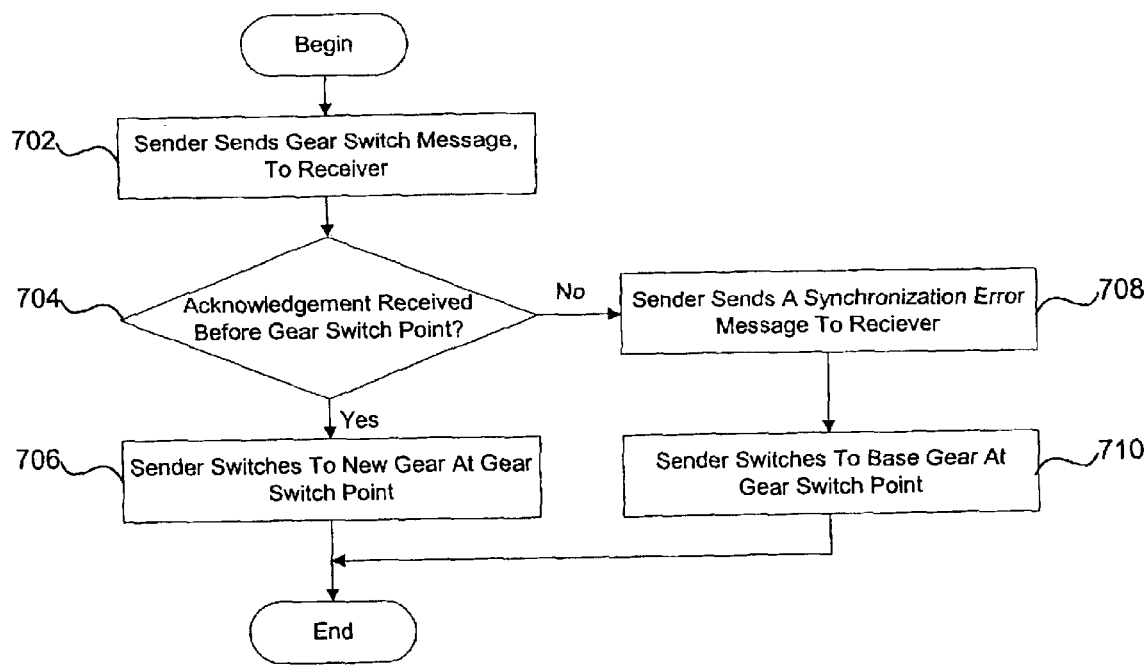
FIGS. 7A and 7B illustrate a gear switching protocol implemented between a sender and receiver.
Figure 7B:
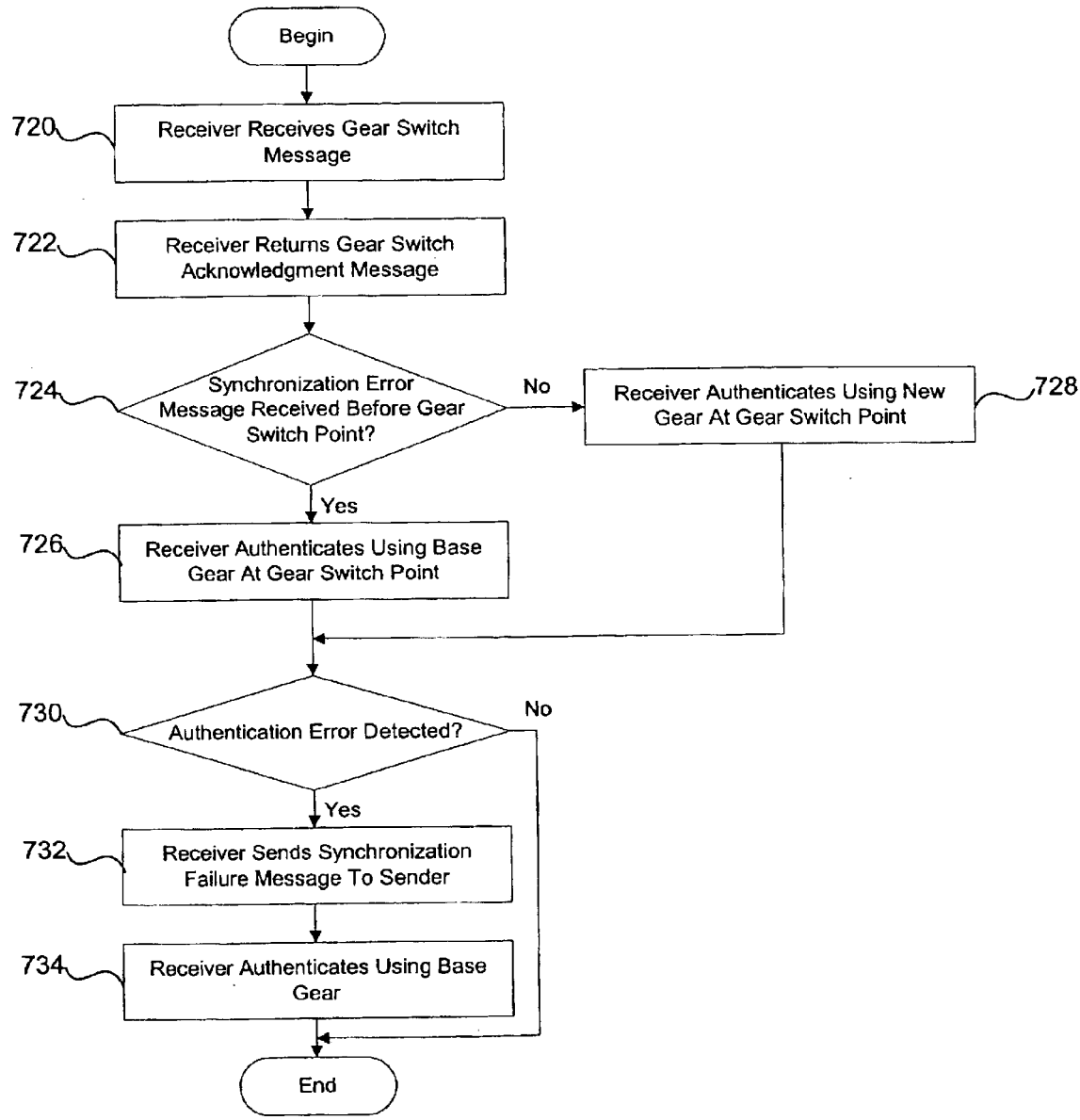

Once the sender determines that the authentication gear should be switched, a gear switching protocol is invoked. One example of a possible gear switching protocol is illustrated in the flowcharts of FIGS. 7A and 7B, which illustrate the processing by the sender and receiver, respectively.

On the sender's side, the process begins at step 702 when the sender securely sends an ACSA control message, called the gear switch message, to the receiver that includes the new gear information and which packet the new gear will begin to be applied. The specified packet is called the gear switch point and can be identified using an IPsec authentication header sequence number. At step 704, the sender then determines whether the receiver sends a reply acknowledging the gear change before the gear switch point.

If it is determined at step 704 that a gear switch acknowledgment message has been returned, then the sender, at step 706, switches to the new gear at the gear switch point. If, however, it is determined at step 704 that a gear switch acknowledgment message has not been returned, then the sender, at step 708, sends a synchronization error message to the receiver. Next, at step 710, the sender switches gears to the base gear at the gear switch point.

On the receiver's side, the process begins at step 720 when the receiver receives a gear switch message. Before the expiration of the heartbeat interval, the receiver, at step 722, then returns a gear switch acknowledgment message.

Next, at step 724, the receiver determines whether a synchronization error message has been received before the gear switch point. If a synchronization error message has been received before the gear switch point, then the receiver, at step 726, switches to the base gear at the gear switch point. If a synchronization error message has not been received before the gear switch point, then the receiver, at step 728, switches to the new gear at the gear switch point.

Upon reaching the gear switch point, the receiver then determines, at step 730, whether an authentication error is detected on the first packet after the gear switch point. If an authentication error is detected, then the receiver, at step 732, sends a synchronization failure message to the sender. Next, at step 734, the receiver authenticates using the base gear. On the other side, the sender will eventually switch back to the base gear, either upon receipt of the synchronization failure message or upon lack of receipt of the heartbeat message within the heartbeat interval.

Having described a general ASCA framework, a preferred embodiment of an ASCA system is now provided. As will be described below, the preferred embodiment relies on open standards and openly developed network security software. The basic approach is the construction of a modular, portable prototype software toolkit that may be integrated with existing, third-party network security software. As would be apparent, non-portable and processor-specific optimizations can also be developed.

It should also be noted that the description of the preferred embodiment should not be construed as a limitation upon the concepts of the present invention. In particular, it should be noted that the concepts of the present invention can be applied to various layers of a particular transport protocol (e.g., open systems interconnect (OSI) model). In general, the concepts of the present invention can be applied to any transmission of a stream of data that has been broken up into segments of finite size. Thus, the concepts of the present invention can be applied to the transmission of frames, packets, datagrams, or the like. In one example, an ACSA system can be used at the application layer to provide authentication of video frames for high-speed video.

In the preferred embodiment, the ACSA system is implemented in accordance with open source packages that implement the IPsec and Internet Key Exchange (IKE) security standards. Representative open source packages that include IKE/PF_KEY/IPsec implementations include PGPnet, NRL, OpenBSD, FreeS/WAN, and NIST Cerberus/PlutoPlus.

Figure 8:
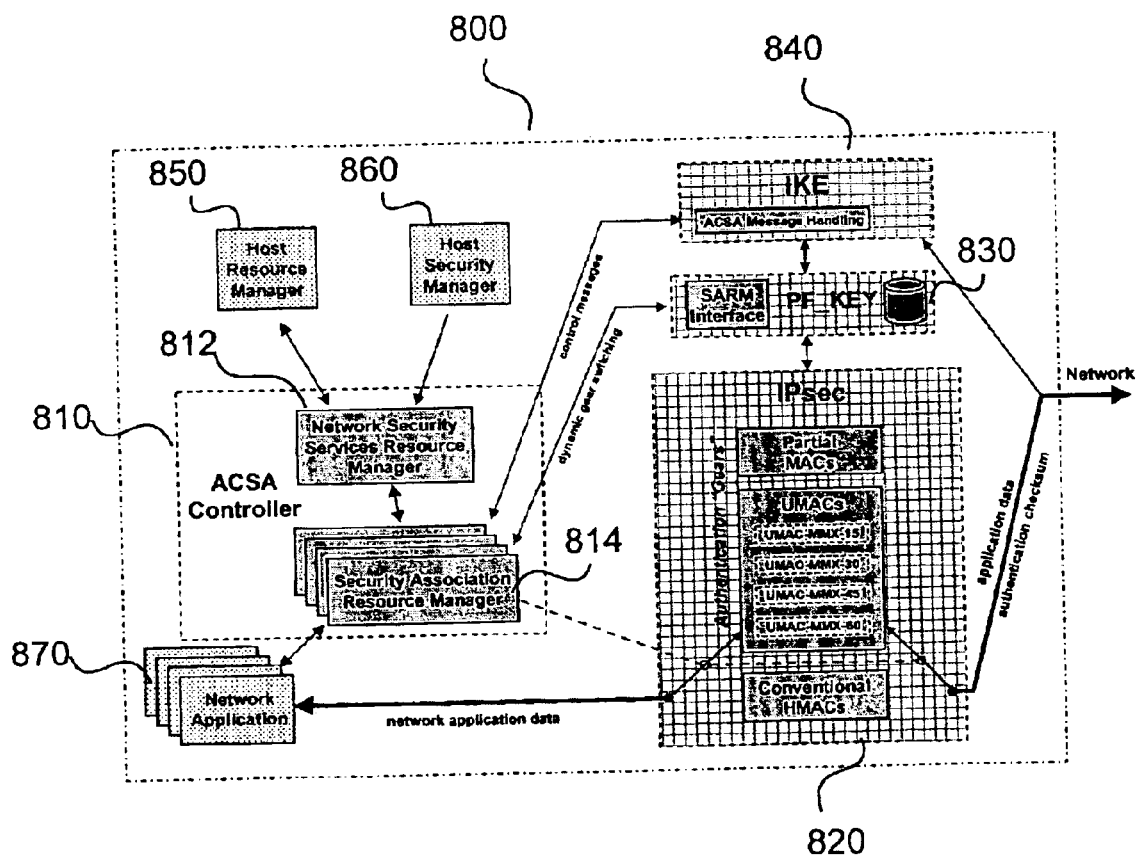
FIG. 8 illustrates a preferred embodiment of an ASCA system that is integrated with third-party software modules.

The ASCA software modules of the preferred embodiment are illustrated in FIG. 8. ASCA system 800 includes four high-level software modules: ACSA Controller module 810, IPsec module 820, PF_KEY module 830, and IKE module 840.

As illustrated, ACSA Controller module 810 includes a network security resource manager (NSSRM) 812 and one or more security association resource managers (SARMs) 814. NSSRM 812 is generally responsible for providing the resource and security constraints within which each SARM 814 context operates. NSSRM 812 can interact with host resource manager (HRM) 850 by requesting and receiving an allocation of resources (e.g., CPU utilization). In operation, NSSRM 812 requests resources from HRM 850 based on the aggregate resource requests of the SARM 814 contexts that it supports. In turn, HRM 850 provides resource allocations based on the NSSRM request and the requests of any other resource managers. In one embodiment, HRM 850 includes a CPU monitor that reports the average CPU utilization to NSSRM 812.

NSSRM 812 can also interact with host security manager (HSM) 860. HSM 860 can be designed to report security policy and network defense status information to NSSRM 812. HSM 860 initially sends and provides updates of the security policy to NSSRM 812. Additionally, HSM 860 provides NSSRM 812 with the status of any known or suspected attacks to the host or system.

In operation, NSSRM 812 processes the host resource and security constraints and judiciously constrains each SARM 814 context accordingly. More specifically, each SARM 814 context is responsible for establishing and maintaining the appropriate strength-performance trade-off for its corresponding network application 870 and system environment. SARM 814 requests resources (e.g., computation time) from NSSRM 812. NSSRM 812 responds to SARM 814 with resource allocations. Additionally, NSSRM 812 provides security policy and network defense status information. In general, NSSRM 812 may constrain each SARM context's resources to account for the aggregate drain on system resources (e.g., CPU load) incurred by multiple SARM 814 contexts.

Generally, whenever a SA is established and the network application 870 elects to use ACSA authentication protection, a corresponding SARM 814 context is established. More specifically, IKE module 840 is responsible for creating a SARM 814 context for a connection that requests ACSA-based authentication security. Each SARM 814 context is responsible for establishing and maintaining an appropriate authentication gear for its corresponding SA. SARM 814 interacts with IPsec module 820 by directing outbound packet processing to use the gear it determines to be appropriate based on current resource and security conditions.

SARM 814 interacts with PF_KEY module 830 by retrieving authentication errors detected and reported to PF_KEY module 830 by IPsec inbound processing. For ACSA-secured outbound connections, SARM 814 initially directs and updates PF_KEY module 830 indicating which security parameters index (SPI) should be applied by IPsec module 820. More specifically, IPsec module 820 queries PF_KEY module 830 for the information regarding which authentication gear should be applied. In turn, PF_KEY module 830 responds with the corresponding gear information. It should be noted that IKE module 840 sends the SPIs and corresponding gear information to PF_KEY module 830 for use by IPsec module 820 after completing the SA negotiation.

For ACSA-secured inbound connections, SARM 814 directs PF_KEY module 830 on a per SPI basis as to whether full, partial, or no verification should be performed by IPsec module 820. More specifically, IPsec module 820 queries PF_KEY module 830 for the gear information corresponding to the SPI contained in the received IPsec header. In turn, PF_KEY module 830 responds with the corresponding gear information. Additionally, PF_KEY module 830 reports SPI byte counts and authentication errors to SARM 814.

SARM 814 also interacts with IKE module 840 to exchange ACSA control messages with the other party. IKE module 840 requests that SARM 814 provide ACSA gear information to prepare an ACSA-based SA proposal. In turn, SARM 814 provides IKE module 840 with ACSA gear information based on its supported gears and the current security policy. Generally, SARM 814 determines the authentication gear and generates appropriate ACSA control messages based on the inputs from NSSRM 812, received ACSA control messages, and inbound authentication errors.

In the preferred embodiment, IPsec module 820, IKE module 830, and PF_KEY module 840 are modified third-party software modules. IPsec module 820 is modified to include functionality that supports (1) new ACSA authentication algorithms, and (2) an interface to allow IPsec inbound processing to report authentication error statistics to PF_KEY module 840. As described above, the additional authentication algorithms represent the various alternative authentication gears that are available. PF_KEY module 830 is modified to include functionality that supports the (1) maintenance of authentication error statistics, (2) support for additional ACSA security association attributes, and (3) support for partial receiver verification. IKE module 840 is modified to include functionality that supports (1) retrieval of ACSA parameter information from SARM 814, (2) ACSA parameter negotiation and SA creation, and (3) ACSA-specific control message communication. A set of functions that can be supported by ACSA controller 810, IPsec module 820, IKE module 830, and PF_KEY module 840 are described in greater detail in Appendix A.

Figure 9:
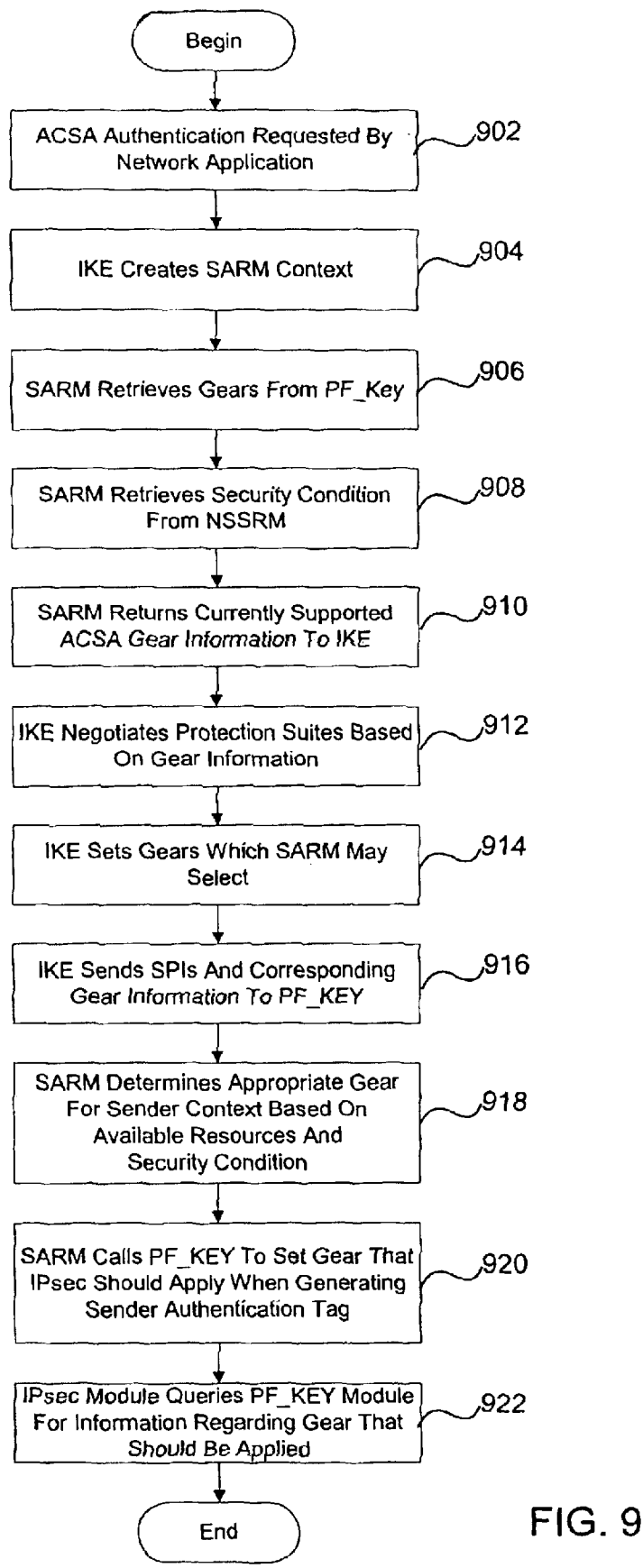
FIG. 9 illustrates a flowchart of an initial authentication gear setup process in an ACSA system that is integrated with third-party software modules.

To illustrate the operation of the components in FIG. 8, the process of setting an initial authentication gear is described with reference to the flowchart of FIG. 9. The flowchart of FIG. 9 begins at step 902 upon the request by network application 870 to use ACSA authentication for a particular SA. Next, at step 904, a SARM 814 context is created. SARM 814 context can be created through a call by IKE module 840 to the createSARMContext function supported by ACSA controller 810. Calling the createSARM-Context function will either spawn a new SARM thread or create a logical context within the ACSA Controller thread.

Upon creation, SARM 814 context, at step 906, calls PF_KEY module 830 to retrieve the supported ACSA gears. Next, at step 908, SARM 814 context retrieves the security condition from NSSRM 812 to determine if any gears should not be returned to IKE module 840 based on the currently defined security policy. This query can be initiated through a call to the querySecurityCondition function supported by ACSA controller 810.

At step 910, SARM 814 context returns the currently supported ACSA gear information to IKE module 840 to be used in ACSA gear negotiation. In one example, the supported gear information includes (1) mandatory conventional algorithm parameters containing a list of mandatory IKE hash attribute values that begins with the most secure algorithm followed in order of decreasing security by all other mandatory algorithms, (2) non-mandatory conventional algorithms parameters containing a list of EKE hash attribute values that begins with the most secure non-mandatory conventional algorithm followed in order of decreasing security by all other non-mandatory conventional algorithms supported that are faster than all mandatory conventional algorithms, (3) a UMAC Support Flag that indicates whether UMACs are supported based on the current security policy, and (4) a PMAC Support Flag that indicates whether PMACs are supported based on the current security policy.

At step 912, IKE module 840 negotiates protection suites based on the supported ACSA gear information. In the negotiation process, an IKE module 840 (operating as the initiator) proposes protection suites based on the gear information provided by SARM 814 context. In one embodiment, SA payloads are proposed in the order of most secure to least secure.

For example, mandatory conventional algorithms can be proposed first. Next, non-mandatory conventional algorithms faster than the fastest mandatory conventional algorithm can be proposed. Next, UMACs from most secure to least secure will be proposed. Finally, for all of the PMAC proposals, the fastest UMAC or conventional algorithm, regardless of security, will be proposed, followed by algorithms with decreasing performance.

The initiator's proposal for the ACSA gear suite can be structured as follows, assuming B UMAC functions:

---

SA Payload #1
    Proposal Payload #1, Protocol 1 (Mandatory Conventional Algorithm)
        Transform #1 (Fastest mandatory conventional algorithm)
        Transform #2 (Next fastest mandatory conventional algorithm)
SA Payload #2
    Proposal Payload #1, Protocol 1 (Additional Conventional Algorithms)
        Transform #1 (Non-mandatory conventional algorithm faster than fastest
        mandatory conventional algorithm)
:
SA Payload #Z
    Proposal Payload #1, Protocol 1 (Additional Conventional Algorithms)
        Transform #1 (Non-mandatory conventional algorithm faster than the
        conventional algorithm in Payload Z-1)
SA Payload #A
    Proposal Payload #1, Protocol 1 (Most Secure UMAC)
        Transform #1 (Transform ID = AH_UMAC_'Most Secure')
SA Payload #A+1
    Proposal Payload #1, Protocol 1 (Second Most Secure UMAC)
        Transform #1 (Transform ID = AH_UMAC_'Second Most Secure')
:
:
SA Payload #A+B-1
    Proposal Payload #1, Protocol 1 (Least Secure UMAC)
        Transform #1 (Transform ID = AH_UMAC_'Least Secure')
SA Payload #C
    Proposal Payload #1, Protocol 1 (PMAC, Bit Selecting w/ Ratio = 1/2)
        Transform #1 (Transform ID = AH_ACSA_PMAC, Selecting Type = Bit
        Selecting, Ratio = 1/2, MAC = AH_UMAC_'Least Secure')
        Transform #2 (Transform ID = AH_ACSA_PMAC, Selecting Type = Bit
        Selecting, Ratio = 1/2, MAC = AH_UMAC_'Second to least secure
        MAC')
        :
        Transform #B (Transform ID = AH_ACSA_PMAC, Selecting Type =
        Bit Selecting, Ratio = 1/2, MAC = AH_UMAC_'Most Secure')
SA Payload #C+1
    Proposal Payload #1, Protocol 1 (PMAC, Bit Selecting w/ Ratio = 1/4)
        Transform #1 (Transform ID = AH_ACSA_PMAC, Selecting Type = Bit
        Selecting, Ratio = 1/4, MAC = AH_UMAC_'Least Secure')
        Transform #2 (Transform ID = AH_ACSA_PMAC, Selecting Type = Bit

```
        Selecting, Ratio = 1/4, MAC = AH_UMAC_'Second to least secure
        MAC')
        :
        Transform #B (Transform ID = AH_ACSA_PMAC, Selecting Type =
        Bit Selecting, Ratio = 1/4, MAC = AH_UMAC_'Most Secure')
SA Payload #C+2
    Proposal Payload #1, Protocol 1 (PMAC, Bit Selecting w/ Ratio = 1/8)
        Transform #1 (Transform ID = AH_ACSA_PMAC, Selecting Type = Bit
        Selecting, Ratio = 1/8, MAC = AH_UMAC_'Least Secure')
        Transform #2 (Transform ID = AH_ACSA_PMAC, Selecting Type = Bit
        Selecting, Ratio = 1/8, MAC = AH_UMAC_'Second to least secure
        MAC')
        :
        Transform #B (Transform ID = AH_ACSA_PMAC, Selecting Type =
        Bit Selecting, Ratio = 1/8, MAC = AH_UMAC_'Most Secure')
SA Payload #C+3
    Proposal Payload #1, Protocol 1 (PMAC, Word Selecting w/ Ratio = 1/8)
        Transform #1 (Transform ID = AH_ACSA_PMAC, Selecting Type =
        Word Selecting, Ratio = 1/8, MAC = AH_UMAC_'Least Secure')
        Transform #2 (Transform ID = AH_ACSA_PMAC, Selecting Type =
        Word Selecting, Ratio = 1/8, MAC = AH_UMAC_'Second to least secure
        MAC')
        :
        Transform #B (Transform ID = AH_ACSA_PMAC, Selecting Type =
        Word Selecting, Ratio = 1/8, MAC = AH_UMAC_'Most Secure')
SA Payload #C+4
    Proposal Payload #1, Protocol 1 (PMAC, Word Selecting w/ Ratio = 1/16)
        Transform #1 (Transform ID = AH_ACSA_PMAC, Selecting Type =
        Word Selecting, Ratio = 1/16, MAC = AH_UMAC_'Least Secure')
        Transform #2 (Transform ID = AH_ACSA_PMAC, Selecting Type =
        Word Selecting, Ratio = 1/16, MAC = AH_UMAC_'Second to least
        secure MAC')
        :
        Transform #B (Transform ID = AH_ACSA_PMAC, Selecting Type =
        Word Selecting, Ratio = 1/16, MAC = AH_UMAC_'Most Secure')
    :
    :
SA Payload #C+10
    Proposal Payload #1, Protocol 1 (PMAC, Word Selecting w/ Ratio = 1/16)
        Transform #1 (Transform ID = AH_ACSA_PMAC, Selecting Type =
        Word Selecting, Ratio = 1/1024, MAC = AH_UMAC_'Least Secure')
        Transform #2 (Transform ID = AH_ACSA_PMAC, Selecting Type =
        Word Selecting, Ratio = 1/1024, MAC = AH_UMAC_'Second to least
        secure MAC')
        :
        Transform #B (Transform ID = AH_ACSA_PMAC, Selecting Type =
        Word Selecting, Ratio = 1/1024, MAC = AH_UMAC_'Most Secure')
```

To more clearly illustrate the operation of this negotiation process, consider an example where an IKE initiator supports, in decreasing order of algorithm security, SHA-1, MD5, TIGER, UMAC-SIMD-60, UMAC-SIMD-45, UMAC-SIMD-30, UMAC-SIMD-15. In this example the IKE initiator would make the following proposal:

```
SA Payload #1
    Proposal Payload #1, Protocol 1 (Mandatory Conventional Algorithm)
        Transform #1 (Transform ID = AH_MD5)
        Transform #2 (Transform ID = AH_SHA-1)
SA Payload #2
    Proposal Payload #1, Protocol 1 (Additional Conventional Algorithms)
        Transform #1 (Transform ID = AH_TIGER)
SA Payload #3
    Proposal Payload #1, Protocol 1 (Most Secure UMAC)
        Transform #1 (Transform ID = AH_UMAC_SIMD_60)
SA Payload #4
    Proposal Payload #1, Protocol 1 (Next Most Secure UMAC)
        Transform #1 (Transform ID = AH_UMAC_SIMD_45)
SA Payload #5
    Proposal Payload #1, Protocol 1 (Next to Least Secure UMAC)
        Transform #1 (Transform ID = AH_UMAC_SIMD_30)
SA Payload #6
    Proposal Payload #1, Protocol 1 (Least Secure UMAC)
        Transform #1 (Transform ID = AH_UMAC_SIMD_15)
```

-continued

SA Payload #7
    Proposal Payload #1, Protocol 1 (PMAC, Bit Selecting w/ Ratio = 1/2)
        Transform #1 (Transform ID = AH_ACSA_PMAC, Selecting Type = Bit Selecting, Ratio 1/2, MAC = AH_UMAC_SIMD_15)
        Transform #2 (Transform ID = AH_ACSA_PMAC, Selecting Type = Bit Selecting, Ratio 1/2, MAC = AH_UMAC_SIMD_30)
        Transform #3 (Transform ID = AH_ACSA_PMAC, Selecting Type = Bit Selecting, Ratio 1/2, MAC = AH_UMAC_SIMD_45)
        Transform #4 (Transform ID = AH_ACSA_PMAC, Selecting Type = Bit Selecting, Ratio = 1/2, MAC = AH_UMAC_SIMD_60)
SA Payload #8
    Proposal Payload #1, Protocol 1 (PMAC, Bit Selecting w/ Ratio = 1/4)
        Transform #1 (Transform ID = AH_ACSA_PMAC, Selecting Type = Bit Selecting, Ratio = 1/4, MAC = AH_UMAC_SIMD_15)
        Transform #2 (Transform ID = AH_ACSA_PMAC, Selecting Type = Bit Selecting, Ratio = 1/4, MAC = AH_UMAC_SIMD_30)
        Transform #3 (Transform ID = AH_ACSA_PMAC, Selecting Type = Bit Selecting, Ratio = 1/4, MAC = AH_UMAC_SIMD_45)
        Transform #4 (Transform ID = AH_ACSA_PMAC, Selecting Type = Bit Selecting, Ratio = 1/4, MAC = AH_UMAC_SIMD_60)
SA Payload #9
    Proposal Payload #1, Protocol 1 (PMAC, Bit Selecting w/ Ratio = 1/8)
        Transform #1 (Transform ID = AH_ACSA_PMAC, Selecting Type = Bit Selecting, Ratio = 1/8, MAC = AH_UMAC_SIMD_15)
        Transform #2 (Transform ID = AH_ACSA_PMAC, Selecting Type = Bit Selecting, Ratio = 1/8, MAC = AH_UMAC_SIMD_30)
        Transform #3 (Transform ID = AH_ACSA_PMAC, Selecting Type = Bit Selecting, Ratio = 1/8, MAC = AH_UMAC_SIMD_45)
        Transform #4 (Transform ID = AH_ACSA_PMAC, Selecting Type = Bit Selecting, Ratio = 1/8, MAC = AH_UMAC_SIMD_60)
SA Payload #10
    Proposal Payload #1, Protocol 1 (PMAC, Word Selecting w/ Ratio = 1/8)
        Transform #1 (Transform ID = AH_ACSA_PMAC, Selecting Type = Word Selecting, Ratio = 1/8, MAC = AH_UMAC_SIMD_15)
        Transform #2 (Transform ID = AH_ACSA_PMAC, Selecting Type = Word Selecting, Ratio = 1/8, MAC = AH_UMAC_SIMD_30)
        Transform #3 (Transform ID = AH_ACSA_PMAC, Selecting Type = Word Selecting, Ratio = 1/8, MAC = AH_UMAC_SIMD_45)
        Transform #4 (Transform ID = AH_ACSA_PMAC, Selecting Type = Word Selecting, Ratio = 1/8, MAC = AH_UMAC_SIMD_60)
SA Payload #11
    Proposal Payload #1, Protocol 1 (PMAC, Word Selecting w/ Ratio = 1/16)
        Transform #1 (Transform ID = AH_ACSA_PMAC, Selecting Type = Word Selecting, Ratio = 1/16, MAC = AH_UMAC_SIMD_15)
        Transform #2 (Transform ID = AH_ACSA_PMAC, Selecting Type = Word Selecting, Ratio = 1/16, MAC = AH_UMAC_SIMD_30)
        Transform #3 (Transform ID = AH_ACSA_PMAC, Selecting Type = Word Selecting, Ratio = 1/16, MAC = AH_UMAC_SIMD_45)
        Transform #4 (Transform ID = AH_ACSA_PMAC, Selecting Type = Word Selecting, Ratio = 1/16, MAC = AH_UMAC_SIMD_60)
:
:
SA Payload #17
    Proposal Payload #1, Protocol 1 (PMAC, Word Selecting w/ Ratio = 1/1024)
        Transform #1 (Transform ID = AH_ACSA_PMAC, Selecting Type = Word Selecting, Ratio = 1/1024, MAC = AH_UMAC_SIMD_15)
        Transform #2 (Transform ID = AH_ACSA_PMAC, Selecting Type = Word Selecting, Ratio = 1/1024, MAC = AH_UMAC_SIMD_30)
        Transform #3 (Transform ID = AH_ACSA_PMAC, Selecting Type = Word Selecting, Ratio = 1/1024, MAC = AH_UMAC_SIMD_45)
        Transform #4 (Transform ID = AH_ACSA_PMAC, Selecting Type = Word Selecting, Ratio = 1/1024, MAC = AH_UMAC_SIMD_60)

Upon receiving the proposals, the IKE module 840 (operating as the responder) pa correspondingly retrieves gear information from its SARM 814 context. For each SA payload, the responder will respond with the lowest number transform that it supports, or reject the entire SA payload. If the IKE responder supports, in decreasing order of algorithm security, SHA-1, MD5, UMAC-SIMD-60, UMAC-SIMD-30, then the IKE responder would respond with the following:

```
SA Payload #1
    Proposal Payload #1, Protocol 1 (Mandatory Conventional Algorithm)
        Transform #1 (Transform ID = AH_MD5)
SA Payload #2
    Proposal Payload #1, Protocol 1 (Additional Conventional Algorithms)
        REJECTED (responder doesn't support TIGER)
SA Payload #3
    Proposal Payload #1, Protocol 1 (Most Secure UMAC)
        Transform #1 (Transform ID = AH_UMAC_SIMD_60)
SA Payload #4
    Proposal Payload #1, Protocol 1 (Next Most Secure UMAC)
        REJECTED (responder doesn't support AH_UMAC_SIMD_45)
SA Payload #5
    Proposal Payload #1, Protocol 1 (Next to Least Secure UMAC)
        Transform #1 (Transform ID = AH_UMAC_SIMD_30)
SA Payload #6
    Proposal Payload #1, Protocol 1 (Least Secure UMAC)
        REJECTED (responder doesn't support AH_UMAC_SIMD_15)
SA Payload #7
    Proposal Payload #1, Protocol 1 (PMAC, Bit Selecting w/ Ratio = 1/2)
        Transform #2 (Transform ID = AH_ACSA_PMAC, Selecting Type = Bit
        Selecting, Ratio = 1/2, MAC = AH_UMAC_SIMD_30)
SA Payload #8
    Proposal Payload #1, Protocol 1 (PMAC, Bit Selecting w/ Ratio = 1/4)
        Transform #2 (Transform ID = AH_ACSA_PMAC, Selecting Type = Bit
        Selecting, Ratio = 1/4, MAC = AH_UMAC_SIMD_30)
SA Payload #9
    Proposal Payload #1, Protocol 1 (PMAC, Bit Selecting w/ Ratio = 1/8)
        Transform #2 (Transform ID = AH_ACSA_PMAC, Selecting Type = Bit
        Selecting, Ratio = 1/8, MAC = AH_UMAC_SIMD_30)
SA Payload #10
    Proposal Payload #1, Protocol 1 (PMAC, Word Selecting w/ Ratio = 1/8)
        Transform #2 (Transform ID = AH_ACSA_PMAC, Selecting Type =
        Word Selecting, Ratio = 1/8, MAC = AH_UMAC_SIMD_30)
SA Payload #11
    Proposal Payload #1, Protocol 1 (PMAC, Word Selecting w/ Ratio = 1/16)
        Transform #2 (Transform ID = AH_ACSA_PMAC, Selecting Type =
        Word Selecting, Ratio = 1/16, MAC = AH_UMAC_SIMD_30)
:
:
SA Payload #17
    Proposal Payload #1, Protocol 1 (PMAC, Word Selecting w/ Ratio = 1/1024)
        Transform #2 (Transform ID = AH_ACSA_PMAC, Selecting Type =
        Word Selecting, Ratio = 1/1024, MAC = AH_UMAC_SIMD_30)
```

As a result of this exchange, a suite of SAs is generated, one for each common authentication gear between the communicants. At step 914, IKE module 840 sets the authentication gears which SARM 814 context may select. This action can be initiated through a call to the setGearSuite function supported by ACSA controller 810. After the gear suite is set, IKE module 840, at step 916, sends the SPI and SA information to PF_KEY module 830 for storage in a security policy database (SPD) and security association database (SAD), respectively.

After the setGearSuite function is called, SARM 814 context, at step 918, determines the sender authentication gear through a call to the determineSenderGear function supported by ACSA controller 810. In this process, SARM 814 context calculates the appropriate gear for the sender context based on considerations such as the available resources and the security condition.

Upon determining the appropriate gear, SARM 814 context, at step 920, sets the sender gear through a call to the setSenderGear function that is supported by PF_KEY module 830. The call to the setSenderGear function sets the authentication gear that IPsec module 820 should apply when generating an authentication tag.

Finally, at step 922, IPsec module 820 processes outbound IP packets by retrieving the appropriate SPI from the SPD in PF_KEY module 830. The retrieved SPI is then used to access the SAD to retrieve the appropriate authentication gear information. Finally, IPsec module 820 performs the authentication tag computation using the selected authentication gear, constructs the authentication header, and forwards the processed IP packet to the next function in outbound processing.

After the initial authentication gear is set, the system can operate in a steady state condition until a change is required. Authentication gear changes can be required upon a change in a variety of resource and security conditions. For example, an ACSA receiver can send a control message to the ACSA sender requesting a gear change. More specifically, SARM 814 context in the ACSA receiver can send ACSA-specific information that is to be sent by IKE module 840 to the other communicant. IKE module 840 sends this information in a notify message within a notification payload.

In general, all ACSA-specific control messages will be sent by the IPsec receiver for the corresponding connection and/or SA(s). Various ACSA-specific control messages such as ACSA-CHANGE-TO-BASE-GEAR-REQUESTED, ACSA-CHANGE-TO-MORE-SECURE-GEAR-REQUESTED, ACSA-CHANGE-TO-FASTER-GEAR-REQUESTED, and ACSA-CHANGE-TO-NON-PMAC-GEAR-REQUESTED messages can be defined.

The ACSA-CHANGE-TO-BASE-GEAR-REQUESTED message can be sent by an IPsec receiver when one of the following conditions exists: (a) one or more authentication errors occur, (b) host or network defenses detect an attack against the system, or (c) any other condition that the IPsec receiver determines may threaten the authentication security of the connection.

The ACSA-CHANGE-TO-MORE-SECURE-GEAR-REQUESTED message can be sent by an IPsec receiver whenever it determines it has excess computational resources and can support performing more secure and computationally intensive authentication tag computations. This message may also be sent when a "soft decision" is made regarding a suspected system attack.

The ACSA-CHANGE-TO-FASTER-GEAR-REQUESTED message can be sent by an IPsec receiver whenever it determines it has insufficient computational resources and can no longer support performing authentication tag computations at the current network data rate.

The ACSA-CHANGE-TO-NON-PMAC-GEAR-REQUESTED message can be sent by an IPsec receiver whenever it determines that PMACs are no longer secure enough for the current environment.

Additionally, the IPsec receiver can also send notify messages within a notification payload whenever an authentication failure occurs. In this case, an ACSA-specific control message is not required, since error type "AUTHENTICATION-FAILED" is already defined in the Internet Security Association and Key Management Protocol (ISAKMP) specification.

As noted, the authentication gears of the ACSA system are a set of authentication mechanisms that achieve a wide spectrum of strength-performance levels. As illustrated in FIG. 3, the authentication mechanisms can be organized in three basic classes: (1) low-speed, high strength mechanisms; (2) higher-speed, lower-strength mechanisms; and (3) high-speed, low-strength mechanisms.

Low-speed, high-strength mechanisms include conventional algorithms that provide strong security but are relatively slow when applied to high-speed network applications. In IPsec, data authentication is provided via the calculation of one of two mandatory-to-implement HMAC algorithms: HMAC-SHA-1-96 and HMAC-MD5-96. The computation of the HMAC results in an integrity check value (ICV) or an authentication tag. The HMAC algorithm is an instantiation of a more general construct called a nested MAC (NMAC) that is described in M. Bellare et al., "Keying Hash Functions for Message Authentication," in *Advances in Cryptology: Proceedings of CRYPTO '96*, LNCS 1109, N. Koblitz ed., Springer Verlag (1996), 1–15, which is herein incorporated by reference in its entirety.

Figure 11:
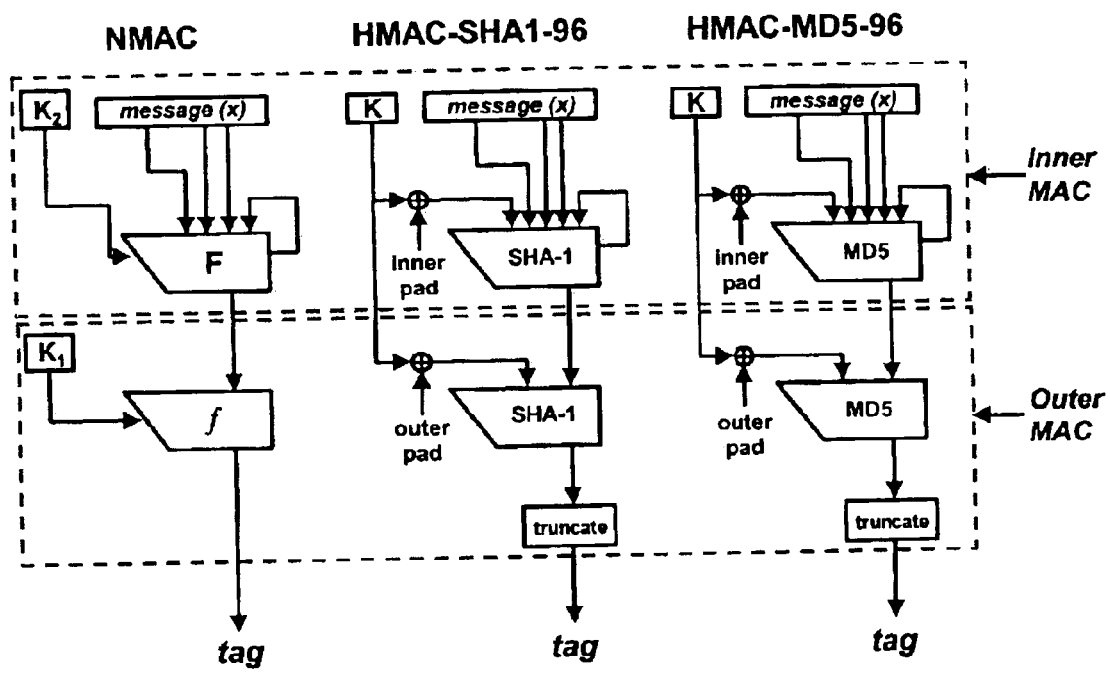
FIG. 11 illustrates a general construct of a nested message authentication code.

The general construction of the NMAC is illustrated in FIG. 11 and can be described mathematically as follows:

$$NMAC_k(x) = f_{k1}(F_{k2}(x))$$

where x is the message being authenticated, k is a key, and k1 and k2 are subkeys derived from k. The "$F_{k2}(x)$" portion of the nested MAC function is referred to as the inner function, whereas the "$f_{k1}(\ )$" portion of the nested MAC function is referred to as the outer function.

As further illustrated in FIG. 11, the HMAC-SHA-1-96 standard is an instantiation of an NMAC construction where (1) k1=k $\oplus$ opad, where $\oplus$ denotes the XOR operation, and where 'opad' is the outer pad constructed by repeating the hexadecimal byte '36' to the input block size of the digest, (2) k2=k $\oplus$ ipad, where 'ipad' is the inner pad constructed by repeating the hexadecimal byte '5c' to the input block size of the digest, (3) F is an SHA-1 hash of the message concatenated with k2, (4) $f$ is an SHA-1 hash of the output of F concatenated with k1, and (5) the output of $f$ is truncated to 96 bits to form the authentication tag. Similarly, the HMAC-MD5-96 standard is an instantiation of nested MAC identical to HMAC-SHA-1-96 except that both F and $f$ use the MD5 hash function.

In general, the performance of the HMAC-SHA-1-96 and HMAC-MD5-96 algorithms are dominated by the speed of the SHA-1 and MD5 hash algorithms, respectively. SHA-1 computation time is approximately 52 Pentium clock cycles per 32-bit message data word, whereas MD5 computation time is approximately 21 clock cycles.

When $f$, the outer function, and F, the inner function, are comprised of strong hash functions, the nested MAC construction is provably secure with excellent security bounds. As pointed out in Bellare et al., the security assumptions on the inner function can be significantly relaxed while still maintaining a high level of security for the entire NMAC. In particular, in an ACSA-style NMAC, the inner function needs to satisfy only a weak collision-resistance property (weaker than that typically required of a MAC), and the outer function may have to satisfy pseudorandomness security properties (stronger than those typically required of a MAC).

This property of the NMAC whereby the inner function may be weaker than the outer function is exploited in the present invention. Since the inner function is applied iteratively, and the outer function only once, a computationally efficient, albeit weaker, inner function can provide a significant performance enhancement to the NMAC calculation. Faster inner functions can be composed from hash functions faster than MD5 and SHA-1. Several candidate hash functions currently exist, including MD4, Bucket Hashing, Multilinear Modular Hashing (MMH), Cyclic Redundancy Code-based Hashing (CRC-64), and Alternative Hash Algorithm (AHA). Inner functions composed of such algorithms as Bucket Hashing and MMH, may be constructed as tree MACs in order to reduce the amount of data to be passed to the outer MAC.

Figure 12:
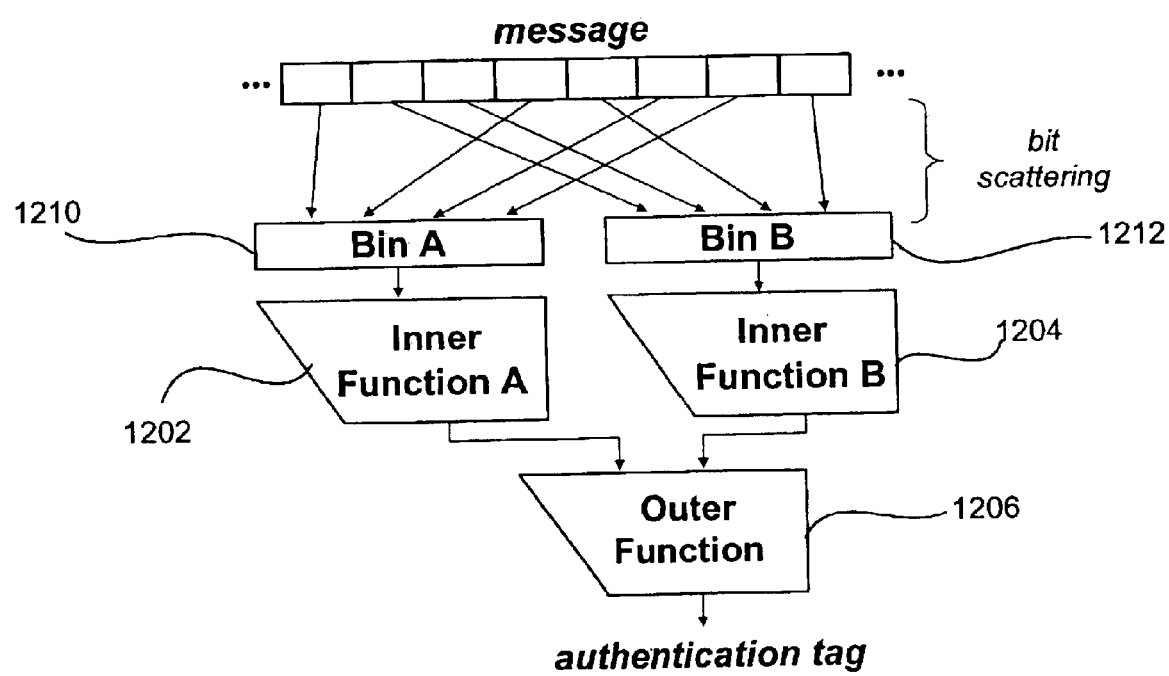
FIG. 12 illustrates a nested structure having multiple inner function groups with bit scattering.

To increase the authentication security of gears with weak inner functions, it is desirable to reduce the adversary's knowledge of the values that contribute to the authentication tag. This reduction in knowledge can be accomplished through the nested structure illustrated in FIG. 12. In this nested structure, two or more inner functions 1202, 1204 are provided that feed a single outer function 1206.

A pseudorandom probabilistic function based on the authentication key is also used to determine which inner function 1202, 1204 each individual data word will contribute to in calculating the authentication tag. By basing the function on the authentication key, the adversary is prevented from knowing the inner function 1202, 1204 to which a given data word contributes. Thus, even if a weak inner function 1202, 1204 is used, an adversary can not readily attack this weakness, since she does not know which data words contribute to the weak inner function 1202, and which contribute to the other inner function 1204.

In this bit scattering function, bits of the message are pseudorandomly sent to one of two or more temporary buffers 1210, 1212 called bins. Bit scattering is simply a data-moving operation that performs no compression. To enable the sender and receiver to synchronize cryptographically, a function based on a secondary authentication key can be used to control the pseudorandom bit-scattering process.

In one embodiment, the following algorithm is used. First, the sender pseudorandomly creates a bit mask as long as the message. To save time, the bit mask can be reused within a SA. Second, the sender pseudorandomly selects a starting point within the mask. Third, processing pairs of data words at a time, the sender logically ANDs and ORs the data words with the corresponding mask words (and their bitwise complements) to select and interleave bits for the two bins 1210, 1212.

The main cryptographic premise of bit scattering is to prevent an adversary from knowing which parts of the message are processed by which inner functions 1202, 1204. Even if an adversary could create collisions in one or more of the lower-strength inner functions 1202, 1204 when attacked in isolation, the adversary would be unable to mount an attack because she would not know the inputs to the inner functions 1202, 1204.

After performing bit scattering, a separate inner function 1202, 1204 is applied to each of bins 1210, 1202. Each inner function 1202, 1204 is keyed using a secondary authentication key. Candidate inner hash functions include MD4, Tiger, AHA, MMH, NMH, Square Hash, Bucket, Evaluation Hash, and Division Hash. Another fast compression algorithm, KR5, can also be used. KR5 is described in greater detail below.

Figure 13:
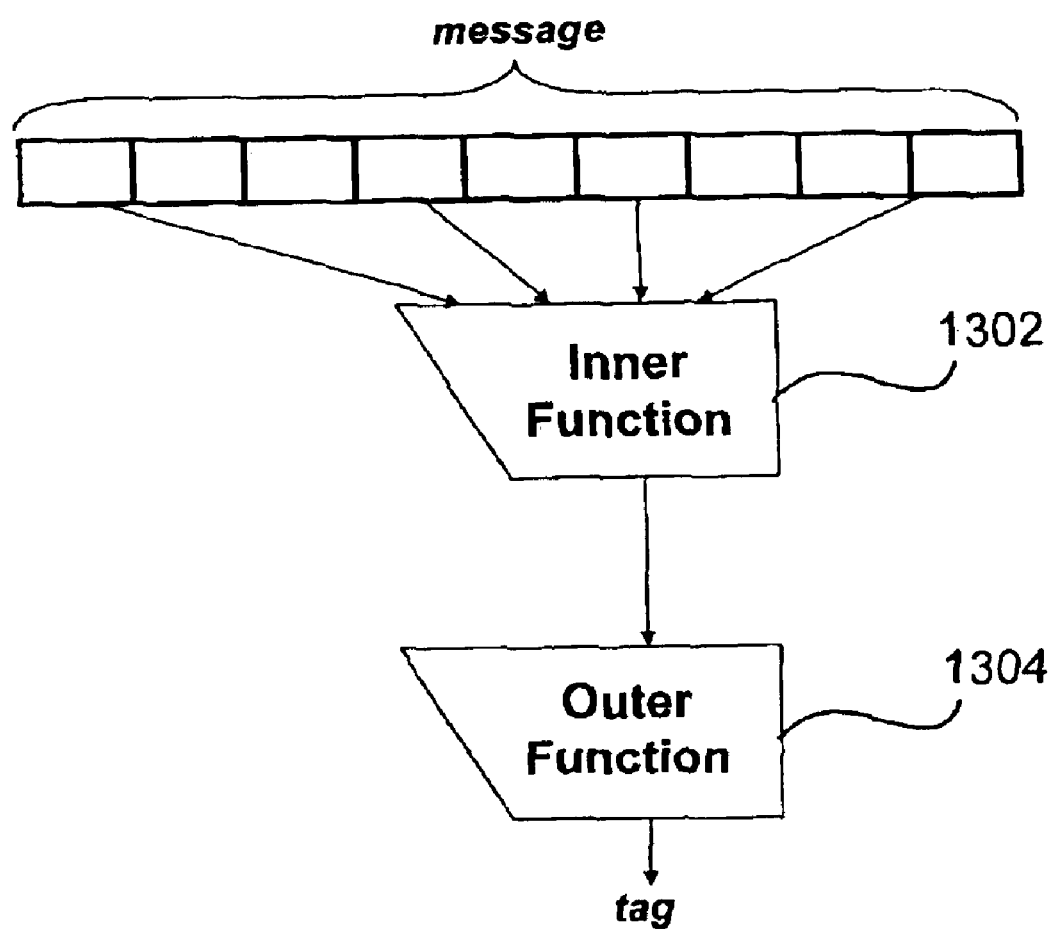
FIG. 13 illustrates a construct of a partial message authentication code.

Once the inner and outer function computations have been made as efficient as practical, further performance enhancement of NMAC-based computations can only feasibly occur by reducing the iterations of the inner function 1202, 1204. Reducing the inner function iterations can be accomplished by reducing the amount of message, x, which is used in the authentication tag computation. Once portions of the message are not included in the authentication tag computation, the probability of the receiver detecting modification of a given data word, a basic measure of security, drops substantially. This process represents a dramatic change in the tradeoff between security and speed. FIG. 13 illustrates a PMAC mechanism for generating an authentication tag using only a subset of data words of a packet.

There are many methods of reducing the amount of the message, x, to be used in the generation of an authentication tag. In one embodiment, the message can simply be truncated. In a preferred embodiment, a keyed pseudorandom probabilistic function is used to determine whether each individual data word will be used in the authentication tag calculation. Since an adversary would not have access to the key used to determine if a data word is included in the authentication tag calculation, the adversary would not know if her attack would succeed. Specifically, the probability that the receiver will detect an adversary modifying a data word will be equal to the probability that a given data word has been included in the authentication tag calculation. Although the probability of detection of a single modified data word within a sparsely-computed-upon message may be quite low, modification of multiple data words is exponentially more likely to be detected. Thus, high-speed network applications that can tolerate a few modified packets, such as video or audio streams, may perform quite satisfactorily using partial authentication.

In general, each message can be viewed as a sequence of message parts (e.g. 64-bit words). Each PMAC has an associated parameter that specifies with what probability each message part will be authenticated. Although there are several different ways in which PMACs can be realized, the main effect is the same: significant time can be saved by applying an authentication algorithm only to selected parts of the message.

Abstractly, it is appealing to think of PMACs as follows. For each message part, the sender tosses a biased coin to decide if that part is to be authenticated. On heads, the sender includes that part in the computation of the authentication tag. On tails, the sender does not include the part in the computation.

The coin flips can be generated in a deterministic pseudorandom fashion using a secondary authentication key derived from the primary authentication key. This way, the receiver can synchronize cryptographically with the sender to know what message parts to include in the authentication tag computation.

In one embodiment, the sender determines a region size, which is greater than the size of the aforementioned message part. The message is processed region-by-region. For each region, exactly one message part is pseudorandomly selected from the region. More specifically, a next message part to be selected is determined by a pseudorandomly-chosen offset from the currently chosen message part, uniformly chosen from the interval $[1, 2L]$. Here, $L=1/p$ (rounded to next highest perfect power of 2), where p is the message-selection percentage.

Figure 14:
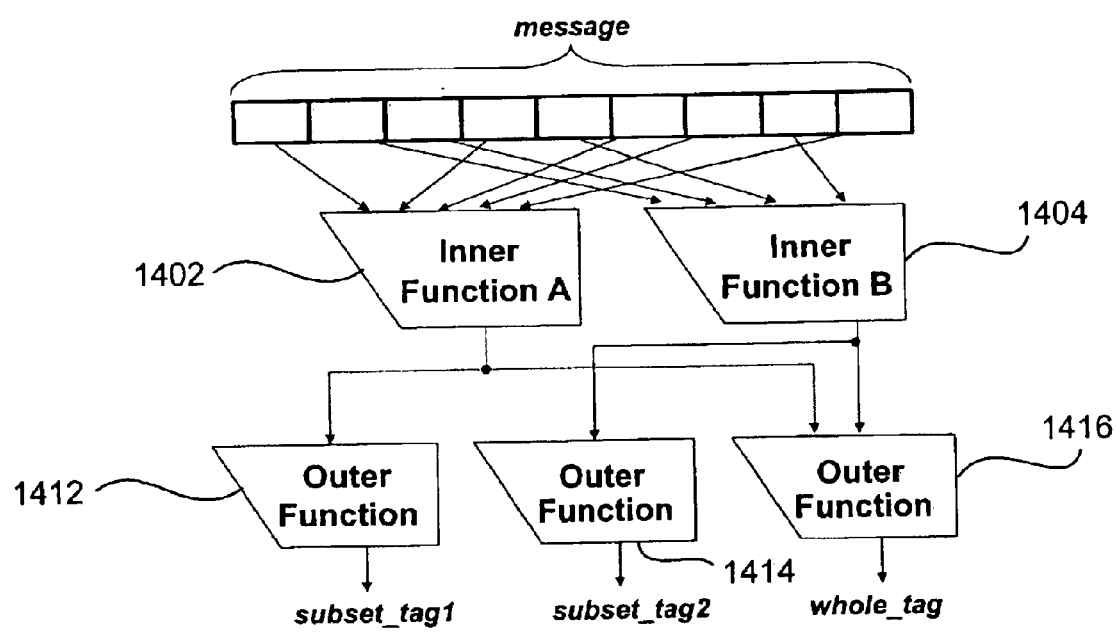
FIG. 14 illustrates a construct that enables the generation of multiple authentication tags.

It is a further feature of the present invention that multiple authentication tags can be generated from an NMAC structure. An embodiment of a mechanism for generating multiple authentication tags is illustrated in FIG. 14. In general, the sender can compute two or more different authentication tags for the same packet, reflecting different strength-performance levels.

In the embodiment of FIG. 14, the sender computes multiple authentication tags using two inner functions A and B, labeled as 1402 and 1404, respectively. Multiple authentication tags can then be separately computed. Subset_tag1 is generated by outer function 1412 based upon inner function A 1402, subset_tag2 is generated by outer function 1414 based upon inner function B 1404, and whole_tag is generated by outer function 1416 based upon the combination of inner function A 1402 and inner function B 1404. In a preferred embodiment, outer functions 1412, 1414, and 1416 represent the same function. A similar but different strategy could also be applied with UMACs and PMACs.

Multiple authentication tags afford the receiver with increased flexibility in adaptively choosing strength-performance levels. Often times the computational resources available to the sender and the receiver may be quite different. In cases where the sender may have more computational resources than the receiver, the sender can provide the receiver with a method to switch to a less computationally intensive gear without the sender changing the transmitted gear. The sender can provide this capability by computing multiple authentication tags on the message data.

For example, the receiver could choose which tag to use in real time based in part on local processor load. Verifying a subset_tag instead of whole_tag requires that only one of the two inner functions 1402, 1404 be calculated and thus reduces the computation time required by the receiver. Thus, subset tags are particularly effective when the receiver has less computational capability available for authentication tag computation than the sender.

Multiple authentication tags are especially useful in multicast environments, where different receivers may have different processor capabilities or security policies, and where the sender typically has more powerful computing capabilities than do the receivers. In this environment, the sender generates a set of authentication tags, and the receiver selects one of the tags for authentication. As noted, the selection of an authentication tag by the receiver can be based on the processor load. The authentication tag can also be selected based upon some measure of the current security environment.

In general, the sender can generate authentication tags for one or more of the authentication gears that are supported by the sender. For example, multiple tags can be generated for one or more authentication gears in one or more of the HMAC, UMAC, and PMAC groups. These multiple authentication tags would enable the universe of receivers in the multicast environment to individually select the particular authentication gear that is appropriate for their individual computing environment.

As described above, multiple authentication tags can be generated using inner function groups with bit scattering. Multiple authentication tags can also be generated for UMACs.

The basic building block of the UMAC is a construct that provides a collision probability of approximately $2^{-15}$. This algorithm is denoted as UMAC-xxx-15, where 'xxx' refers to either the STD or SIMD methods of computation. Based on this building block, UMAC offers '30', '45', and '60' versions with correspondingly stronger collision probabilities.

UMAC can be used to provide multiple authentication tags by providing a tag for each of the building blocks that constitute the overall UMAC authentication tag. Each tag is the result of performing a pseudorandom function on a different partial computation of the total UMAC computation. For the four security levels of UMAC, the following authentication tags can be provided:

TABLE 1

Multiple Authentication Tags for Various UMAC Gears

| Currently Selected Gear | Computed Authentication Tags |
| --- | --- |
| UMAC-xxx-60 | UMAC-xxx-60, UMAC-xxx-45, UMAC-xxx-30, and UMAC-xxx-15 |
| UMAC-xxx-45 | UMAC-xxx-45, UMAC-xxx-30, and UMAC-xxx-15 |
| UMAC-xxx-30 | UMAC-xxx-30 and UMAC-xxx-15 |
| UMAC-xxx-15 | UMAC-xxx-15 only |

As noted above, the provision of multiple authentication tags enables the receiver to only validate the result it has sufficient resources to calculate. For instance, if the selected gear is UMAC-SIMD-60 and the receiver has sufficient resources to calculate UMAC-SIMD-60, it will attempt to verify that result. However, if the receiver only has sufficient resources to calculate UMAC-SIMD-15, it can attempt to verify the result corresponding to that MAC instead.

It is a feature of the present invention that a receiver can perform a partial verification. In this process, the receiver can verify an authentication tag that was generated using only some of the message data or at a lower security level, even though the sender also provided an authentication tag performed over all of the message data or a higher security level.

Figure 15:
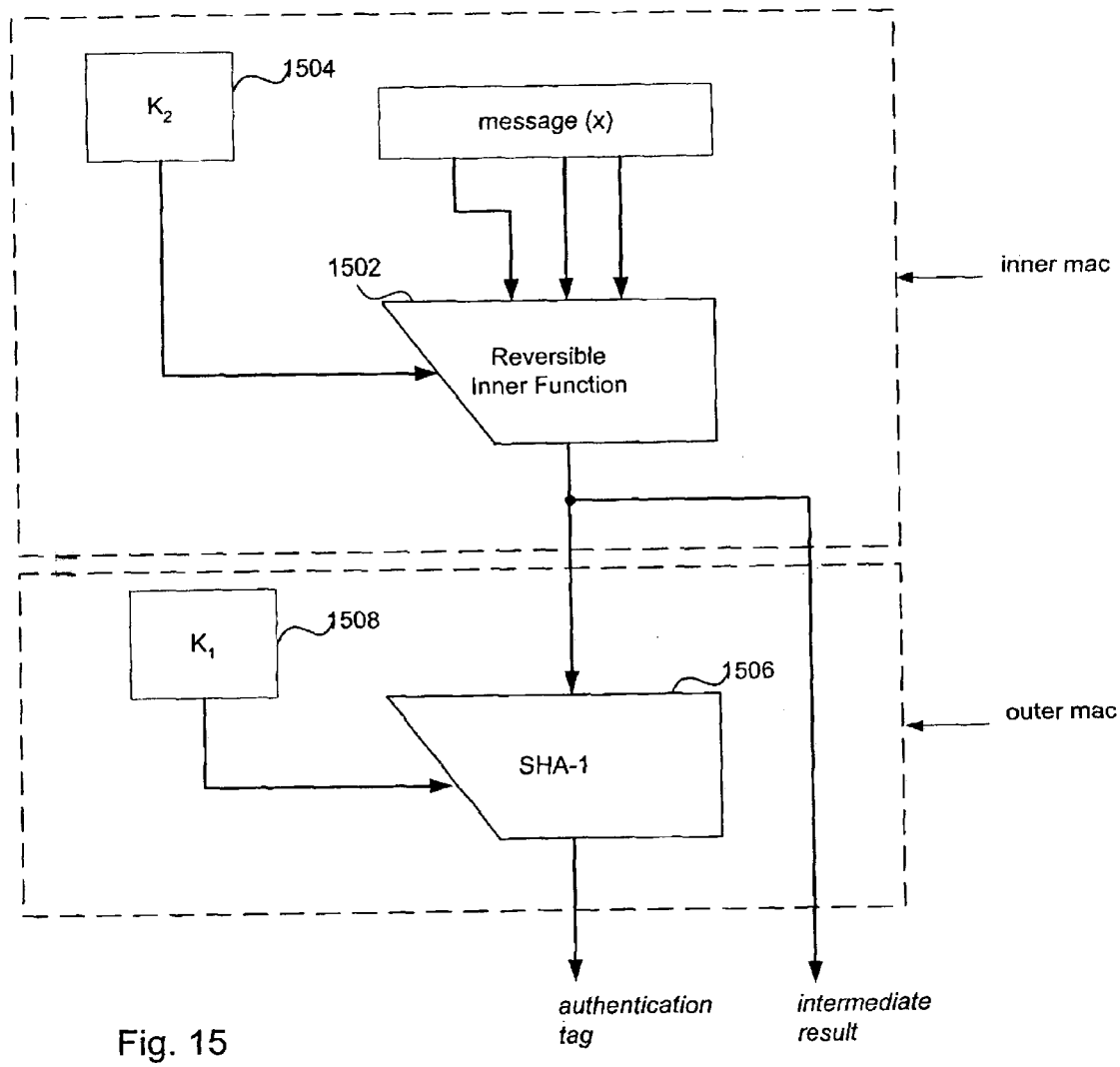
FIG. 15 illustrates a nested message authentication code mechanism with error detection and error correction.

It is a further feature of the present invention that message authentication codes can be used for error detection as well as error correction. Conventional secure communications systems perform both error detection and error correction functions as well as keyed data integrity as part of the system's authentication. Because the keyed data integrity function alone can detect errors with high probability, providing both of these functions is redundant. Conventional MACs can be used for error detection, but have no capability for error correction. An embodiment of a mechanism for providing both error detection and error correction is illustrated in FIG. 15. In general, a reversible inner function in a nested MAC configuration can be used to provide both error detection and error correction in high performance applications.

In the embodiment of FIG. 15, the sender computes an authentication tag using a reversible inner function 1502. An intermediate result is generated by reversible inner function 1502 and used by outer function 1506 to generate an authentication tag as described above.

Figure 16:
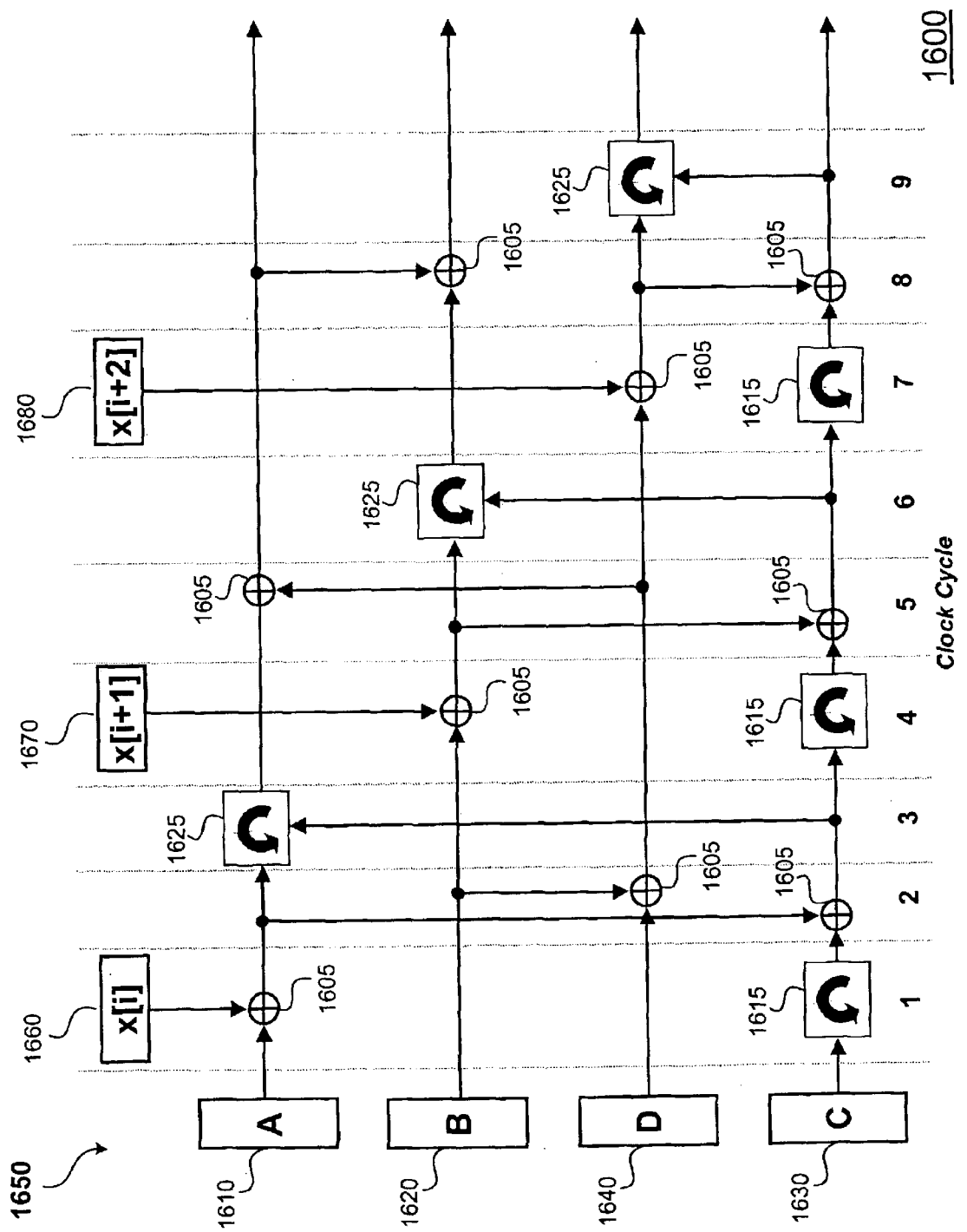
FIG. 16 illustrates a processing block for a KR5 algorithm.

Various functions, or families of functions, may be used as reversible inner function 1502. A reversible function is a function that can be reversed, or inversed, so that the inputs can be obtained from the outputs. FIG. 16 illustrates a KR5 reversible function as used in a preferred embodiment of the present invention.

As illustrated in FIG. 16, KR5 employs only XOR operations, rotates, and keyed rotates in its operation, making it simple to analyze. While KR5 will work on a variety of processing platforms, KR5 is particularly suited for operation in a Pentium II-class processing environment. It is in this environment that the preferred embodiment of the present invention is now described. KR5 employs four working registers 1650: register A, register B, register C, and register D, labeled in FIG. 16 as 1610, 1620, 1630, and 1640, respectively. In the Pentium II, these registers advantageously correspond to EAX, EBX, ECX, and EDX, respectively.

KR5 preferably operates on three message data words per "block." FIG. 16 illustrates the operations performed in a block 1600 of KR5, and in particular on a first data word x[i], a second data word x[i+1], and a third data word x[i+2] labeled as 1660, 1670, and 1680 respectively. The operations of KR5 include an XOR operation 1605, a rotate operation 1615, and a keyed rotate 1625. Each of these functions is now described with reference to its operation on a Pentium II.

XOR operation 1605 performs an "exclusive or" operation on the contents of one of registers A, B, or D, using one of the data words x[i], x[i+1] or x[i+2]. The results of the operation are stored in the respective register A, B, or D.

Keyed rotate operation 1625 performs a bit-wise rotate on the contents of one of registers A, B, or D, "keyed" on the contents of register C. In other words, the value of register C determines the number of bits by which the "rotatee" registers A, B, or D is rotated. As would be apparent, either clockwise or counter-clockwise rotations may be used.

Rotate operation 1615 perform a fixed rotate, or "rotate immediate" operation on the contents of "rotator" register C. This fixed rotation is preferably selected as the base two logarithm of the processor size, which in case of the Pentium II, is $\log_2(32)$, or 5 bits. As illustrated, this fixed rotate occurs once for each of the data words.

As illustrated, the three data words of block 1600 are processed in nine clock cycles. During a first clock cycle, the contents of EAX are XOR'd by the first data word and the contents of ECX are rotated by a fixed amount. During a second clock cycle, the contents of ECX are XOR'd with the contents of EAX and the contents of EDX are XOR'd with the contents of EBX. During a third clock cycle, the contents of EAX are rotated, keyed by the contents of EAC. This completes the processing of the first data word in block 1600.

During a fourth clock cycle, the contents of EBX are XOR'd by the second data word and the contents of ECX are rotated by the fixed amount. During a fifth clock cycle, the contents of ECX are XOR'd with the contents of EBX and the contents of EAX are XOR'd with the contents of EDX. During a sixth clock cycle, the contents of EBX are rotated, keyed by the contents of ECX. This completes the processing of the second data word in block 1600.

During a seventh clock cycle, the contents of EDX are XOR'd by the third data word and the contents of ECX are rotated by the fixed amount. During a eighth clock cycle, the contents of ECX are XOR'd with the contents of EDX and the contents of EBX are XOR'd with the contents of EAX. During a ninth clock cycle, the contents of EDX are rotated, keyed by the contents of ECX. This completes the processing of the third data word in block 1600.

The above-described process is repeated for each block 1600 of three data words in the message. In a preferred embodiment, so that KR5 can be used as a MAC, the working registers A, B, C, and D are initialized with a secure key (such as $K_2$ illustrated in FIG. 15). Table II includes equations mathematically describing the operations performed in KR5 at each of the clock cycles according to the preferred embodiment of the present invention.

TABLE II

KR5 ALGORITHM

| CLOCK CYCLE | REGISTER VALUES |
|---|---|
| n = 1 | $A_1 = A_0 \oplus x[i]$ |
|  | $B_1 = B_0$ |
|  | $C_1 = C_0$ rot 5 |
|  | $D_1 = D_0$ |
| n = 2 | $A_2 = A_1$ |
|  | $B_2 = B_1$ |
|  | $C_2 = C_1 \oplus A_1$ |
|  | $D_2 = D_1 \oplus B_1$ |
| n = 3 | $A_3 = A_2$ rot $C_2$ |
|  | $B_3 = B_2$ |
|  | $C_3 = C_2$ |
|  | $D_3 = D_2$ |
| n = 4 | $A_4 = A_3$ |
|  | $B_4 = B_3 \oplus x[i + 1]$ |
|  | $C_4 = C_3$ rot 5 |
|  | $D_4 = D_3$ |
| n = 5 | $A_5 = A_4 \oplus D_4$ |
|  | $B_5 = B_4$ |
|  | $C_5 = C_4 \oplus B_4$ |
|  | $D_5 = D_4$ |
| n = 6 | $A_6 = A_5$ |
|  | $B_6 = B_5$ rot $C_5$ |
|  | $C_6 = C_5$ |
|  | $D_6 = D_5$ |
| n = 7 | $A_7 = A_6$ |
|  | $B_7 = B_6$ |
|  | $C_7 = C_6$ rot 5 |
|  | $D_7 = D_6 \oplus x[i + 2]$ |
| n = 8 | $A_8 = A_7$ |
|  | $B_8 = B_7 \oplus A_7$ |
|  | $C_8 = C_7 \oplus D_7$ |
|  | $D_8 = D_7$ |
| n = 9 | $A_9 = A_8$ |
|  | $B_9 = B_8$ |
|  | $C_9 = C_8$ |
|  | $D_9 = D_8$ rot $C_8$ |

The probability of forging a message protected by a nested MAC using KR5 as the inner function is approximately $2^{-10}$. However, the speed and security of the nested MAC using KR5 is comparable to that of UMAC-SIMD-15 when executed on a non-MMX platform. Furthermore, the reversibility of KR5 provides error correction capability not presently available.

Figure 17A:
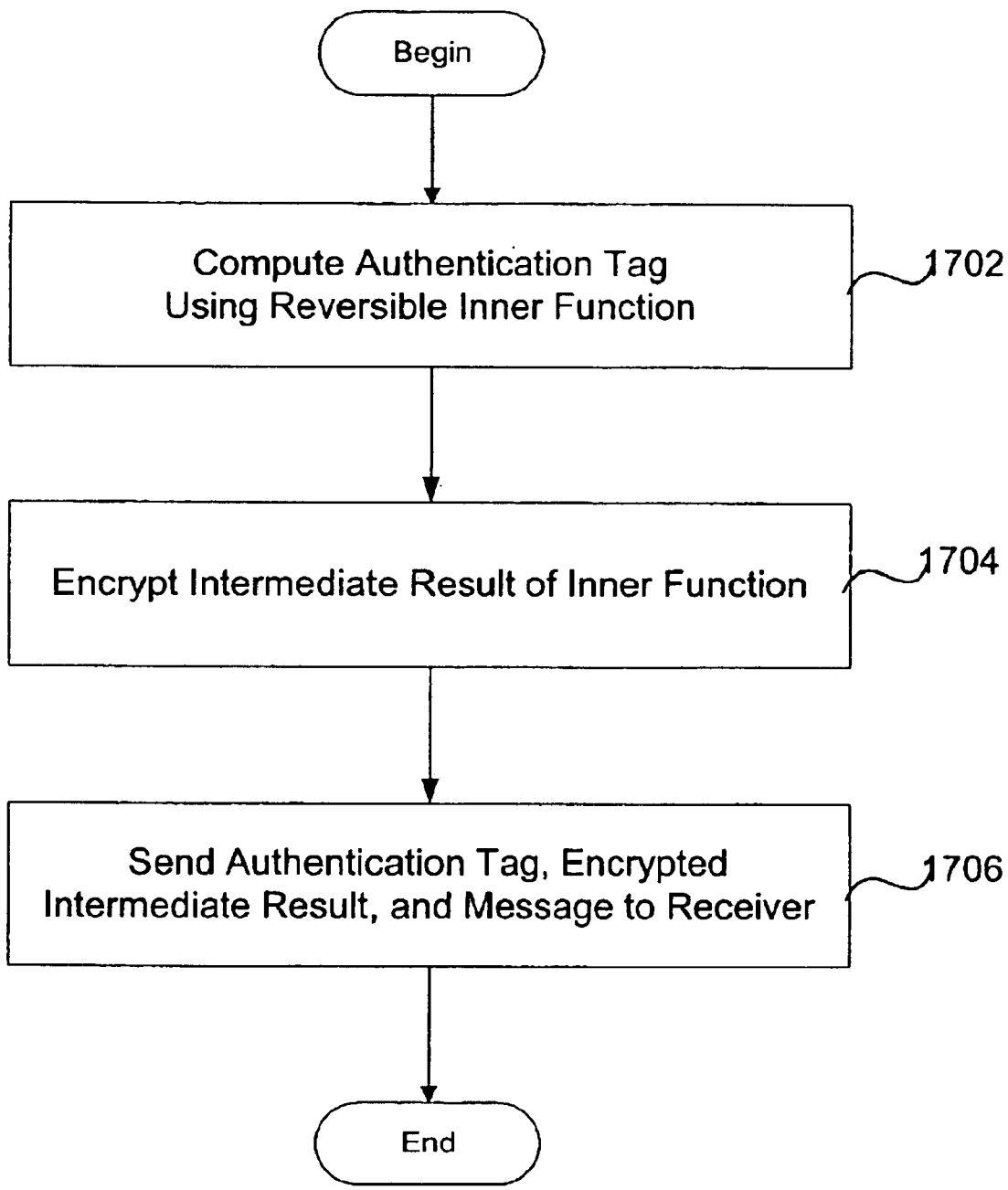
FIGS. 17A and 17B illustrate a flowchart of an error correction protocol for use with a nested message authentication code implemented between a sender and a receiver.
Figure 17B:
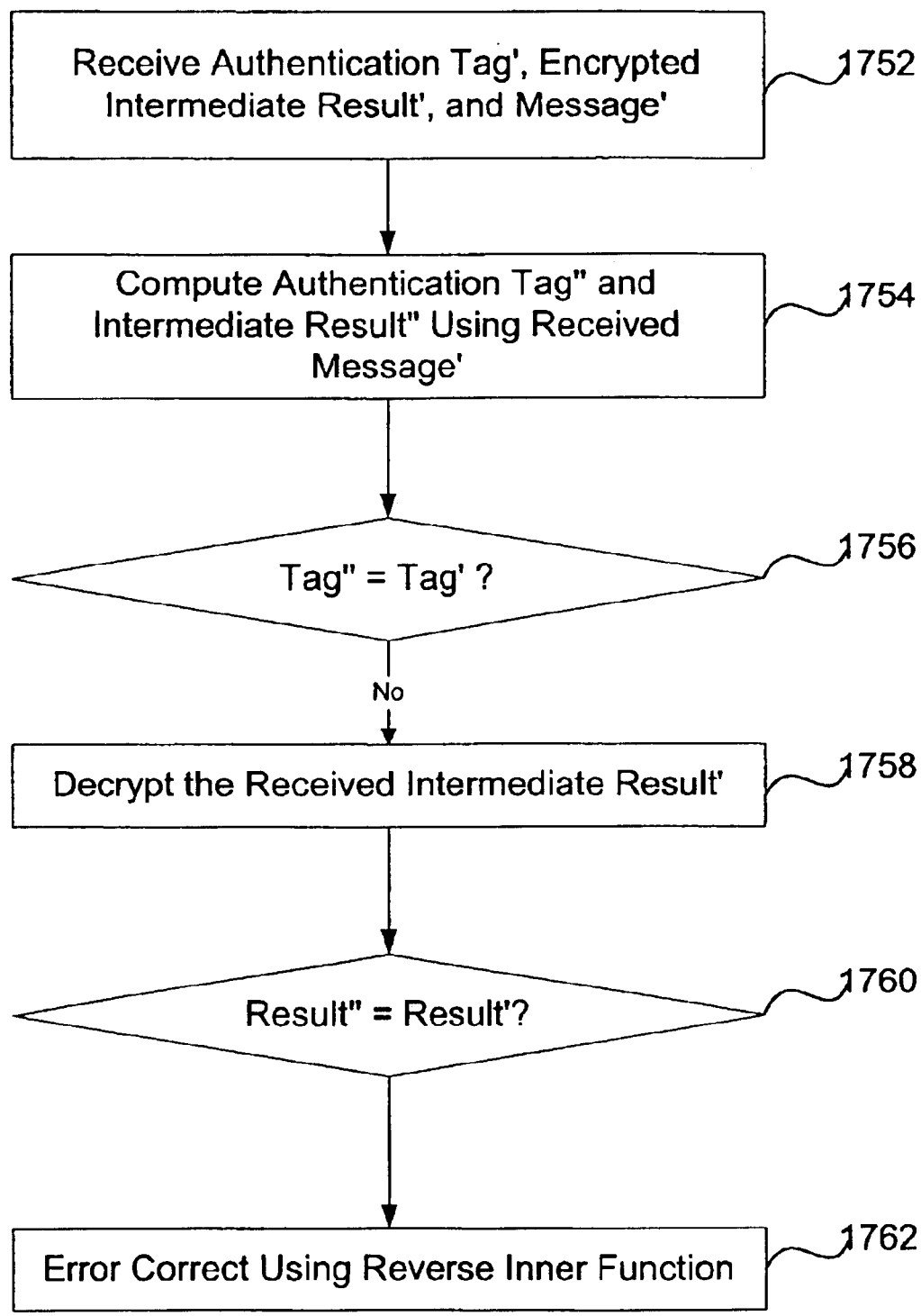

The present invention provides a protocol for providing error correction with a nested MAC using a reversible inner function 1502. This protocol is illustrated in FIGS. 17A and 17B, which illustrate the processing by the sender and receiver respectively.

On the sender's side, the process begins at step 1702 when the sender computes an authentication tag using on the message to be sent to the receiver. The authentication tag is computed using a reversible inner function 1502, such as KR5, and an outer function 1506. The intermediate result from the reversible inner function is forwarded to the outer function as would be apparent.

At step 1704, the sender encrypts the intermediate result from the reversible inner function, and at step 1706 sends the message, the authentication tag, and/or the encrypted intermediate result to the receiver. In one embodiment of the present invention, the sender periodically encrypts and sends an intermediate result of the reversible inner function (e.g., every x data words, or every x blocks, etc.). In a preferred embodiment of the present invention, the sender encrypts and sends only the final intermediate result of the reversible inner function at the end of the message.

On the receiver's side, the process begins at step 1752 when the receiver receives the message', the authentication tag', and the encrypted intermediate result'. At step 1754, the receiver computes an authentication tag" (and in so doing, an intermediate result") using the same inner and outer functions as used by the sender.

If it is determined at step 1756 that the received authentication tag' and the computed authentication tag" are the same, the receiver verifies the message. If, however, it is determined at step 1756 that the received authentication tag' and the computed authentication tag" are not the same, then the receiver, at step 1758, decrypts the encrypted intermediate results'.

If it is determined at step 1760 that the received intermediate result' and the computed intermediate result" are the same, the receiver cannot verify the message. If, however, it determined at step 1760 that the received intermediate result' and the computed intermediate result" are not the same, the receiver assumes an error exists in the received message, and at step 1762, can correct up to an entire data word of error by advantageously using the reversibility of the inner function; provided, of course, that there are no errors in the received encrypted intermediate result'.

To find the data word that includes the error, the receiver uses the received intermediate result' to initialize and execute the inner function in the "reverse," or opposite, direction as that illustrated in FIG. 16. Table III includes equations mathematically describing the reverse inner function operations of KR5 performed at each of the clock cycles according to the preferred embodiment of the present invention.

TABLE III

REVERSE KR5 ALGORITHM

| CLOCK CYCLE | REGISTER VALUES |
|---|---|
| n = 8 | $A_8 = A_9$ |
|  | $B_8 = B_9$ |
|  | $C_8 = C_9$ |
|  | $D_8 = D_9$ rot $-C_9$ |
| n = 7 | $A_7 = A_8$ |
|  | $B_7 = B_8 \oplus A_8$ |
|  | $C_7 = C_8 \oplus D_8$ |
|  | $D_7 = D_8$ |

TABLE III-continued

REVERSE KR5 ALGORITHM

| CLOCK CYCLE | REGISTER VALUES |
|---|---|
| n = 6 | $A_6 = A_7$ |
|  | $B_6 = B_7$ |
|  | $C_6 = C_7$ rot $-5$ |
|  | $D_6 = D_7 \oplus x[i + 2]$ |
| n = 5 | $A_5 = A_6$ |
|  | $B_5 = B_6$ rot $-C_6$ |
|  | $C_5 = C_6$ |
|  | $D_5 = D_6$ |
| n = 4 | $A_4 = A_5 \oplus D_5$ |
|  | $B_4 = B_5$ |
|  | $C_4 = C_5 \oplus B_5$ |
|  | $D_4 = D_5$ |
| n = 3 | $A_3 = A_4$ |
|  | $B_3 = B_4 \oplus x[i + 1]$ |
|  | $C_3 = C_4$ rot $-5$ |
|  | $D_3 = D_4$ |
| n = 2 | $A_2 = A_3$ rot $-C_3$ |
|  | $B_2 = B_3$ |
|  | $C_2 = C_3$ |
|  | $D_2 = D_3$ |
| n = 1 | $A_1 = A_2$ |
|  | $B_1 = B_2$ |
|  | $C_1 = C_2 \oplus A_2$ |
|  | $D_1 = D_2 \oplus B_2$ |
| n = 0 | $A_0 = A_1 \oplus x[i]$ |
|  | $B_0 = B_1$ |
|  | $C_0 = C_1$ rot $-5$ |
|  | $D_0 = D_1$ |

At each clock cycle, the receiver stores the working registers for the reverse inner function. This reverse working register information is compared with the forward working register information, which may be recomputed and stored in a similar fashion, or alternatively, stored off during the initial authentication processing, to identify the erroneous message data word.

If the message includes only one erroneous data word, then comparing the forward working register information with the reverse working register information will reveal at least one clock cycle where three of the four working registers matches their respective counterpart, and the remaining working register does not match its counterpart. The erroneous message data word is the data word that gets XOR'd in this clock cycle with the working register that does not match its counterpart. If the message includes more than one erroneous message data word, then no clock cycles will be identified where three of the four working registers match and the errors cannot be corrected.

Note that the number of comparisons necessary to identify the appropriate clock cycle can be reduced by checking only those clock cycles within which message data words are XOR'd with one of registers A, B, or D, (e.g., clock cycles 1, 4, 7, etc.).

Once the erroneous data word is identified, it can be corrected by XORing the non-matching working registers with one another and then XORing this result with the erroneous data word.

It is a feature of the present invention that the receiver need not process (i.e., decrypt) the encrypted intermediate result' if the authentication tag verifies the message properly. Furthermore, the receiver need not perform other forms of error correction in parallel with the authentication.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

APPENDIX A

Supported Functions

1. SARM Public Functions
createSARMContext
• Called by: IKE
• Inputs: contextType (sender or receiver)
• Output: supportedGearSuite, contextHandle
• Description: This function will be called by the IKE module and will establish either a sender or receiver SARM context for a given connection. Calling this function will either spawn a new SARM thread or create a logical context within the ACSA Controller thread. During creation, the SARM will call a PF_KEY function to retrieve the supported ACSA gears. Next, the SARM will query and retrieve the security condition from the NSSRM to determine if any gears should not be returned to IKE based on the currently defined security policy. Finally, the SARM will return the currently supported ACSA gear information to IKE to be used in ACSA gear negotiation. The thread responsible for this SARM context will wait for a setGearSuite command before performing any further actions.
deleteSARMContext
• Called by: IKE
• Inputs: contextHandle
• Output: none
• Description: This function will be called by the IKE module whenever a Delete Payload message is received or any other indication than an SA has expired. This function will release the contextHandle.
receiveInboundControlMessage
• Called by: IKE
• Inputs: inboundControlMessage, contextHandle
• Output: none
• Description: Whenever the IKE module receives an ACSA control message, it will pass the control message to the appropriate SARM sender context. The SARM context will call determineSenderGear based on the receiver's authentication error information or recommended gear information.

APPENDIX A-continued

Supported Functions setGearSuite
* Called by: IKE
* Inputs: gearSuiteInfo, contextHandle
* Output: none
* Description: Upon the completion of ACSA gear suite negotiation, whether from an IKE initiator or IKE responder perspective, the IKE module will call this function to establish the set of gears which the SARM may select (sender) or recommend (receiver). This function will cause the SARM to request resources from the NSSRM and then determine the appropriate gear to select or recommend from among the gear suite. If this is a sender context, the SARM will call PF_KEY and set the connection's gear. If this is a receiver context, the SARM will call PF_KEY to set the partial receiver verification values for each gear of the gear suite.
setResourceAllocation
* Called by: NSSRM
* Inputs: resourceAllocation, contextHandle
* Output: none
* Description: Periodically or when a dramatic resource change occurs, the NSSRM will notify the SARM of a new resource allocation. Based on this new resource allocation, each SARM context will re-determine the selected or recommended gear.
setSecurityCondition
* Called by: NSSRM or network application
* Inputs: securityCondition, contextHandle
* Output: none
* Description: Whenever a change in security policy or a security condition occurs, the NSSRM or network application will notify the SARM. Based on the revised security condition, each SARM context will re-determine the selected or recommended gear.
5.1.1.1.2 SARM Private Functions
2. SARM Private Functions
createOutboundControlMessage
* When executed: As a result of a large disparity between the receiver's desired gear and the current gear detected when executing the determinePartialReceiverVerification function.
* Description: This function will construct an appropriate control message based on the current available resources and the security condition. Possible messages include: ACSA-CHANGE-TO-BASE-GEAR-REQUESTED, ACSA-CHANGE-TO-MORE-SECURE-GEAR-REQUESTED, ACSA-CHANGE-TO-FASTER-GEAR-REQUESTED, ACSA-CHANGE-TO-NON-PMAC-GEAR-REQUESTED.
determinePartialReceiverVerification
* When executed: As a result of a SetGearSuite call, whenever the NSSRM updates the resource allocation, whenever the NSSRM updates the security condition, and periodically upon expiration of a timer.
* Description: Upon any of the conditions described above, the SARM will recalculate the appropriate partial verification for the receiver context based on available resources and the security condition. Upon determining the partial verification, the SARM will call the setPartialVerification function within the PF_KEY module. At this time the SARM will determined its desired gear. The desired gear is the receiver's best compromise of security and resources. If there is a great disparity between the receiver's desired gear and the current gear, the SARM may elect to call createOutboundControlMessage to notify the sender of the disparity.
determineSenderGear
* When executed: As a result of a SetGearSuite call, whenever an ACSA control message is received, whenever the NSSRM updates the resource allocation, whenever the NSSRM updates the security condition, and periodically upon expiration of a timer.
* Description: Upon any of the conditions described above, the SARM will recalculate the appropriate gear for the sender context based on available resources and the security condition. Upon determining the appropriate gear, the SARM will call the setSenderGear function within the PF_KEY module.
handleAuthError
* When executed: Whenever the main thread detects that PF_KEY has written data to the authentication error socket.
* Description: Whenever the number of authentication errors for a connection exceeds the authentication error threshold, the PF_KEY module will write the authentication error information into the authentication error socket. After reading the authentication error information, the SARM will then determine whether to notify the sender of a new recommended gear and will recalculate the receive partial verification values and notify the PF_KEY module of any changes.
2. NSSRM public functions
querySecurityCondition
* Called by: SARM
* Inputs: contextHandle
* Output: securityCondition
* Description: Upon creation, a SARM context will request the current security condition.
requestResources
* Called by: SARM
* Inputs: contextHandle, gearSuiteInfo
* Output: resourceAllocationValue
* Description: Due to various events, the SARM will request resources to support authentication security of a connection it is managing. The NSSRM will allocate resources to the requesting SARM context based on its overall allocation from the HRM and the resource needs of any other

APPENDIX A-continued

Supported Functions

SARM contexts.
setResourceAllocation
• Called by: HRM
• Inputs: resourceAllocation
• Output: none
• Description: Periodically or when a dramatic resource change occurs, the HRM will notify the NSSRM of a new resource allocation. Based on this new resource allocation, the NSSRM will re-determine the resource allocation of all SARM contexts by invoking the recalculateResourceAllocation function.
setSecurityCondition
• Called by: HSM
• Inputs: securityCondition
• Output: none
• Description: Whenever a change in security policy or a security condition occurs, the HSM will notify the NSSRM. Based on the revised security condition, the NSSRM may notify each SARM context which will in turn re-determine the selected or recommended gear.
4. NSSRM private functions
determineResourceAllocation
• When executed: As a result of requestResources, setResourceAllocation or setSecurityCondition calls, and periodically upon expiration of a timer.
• Description: Upon any of the conditions described above, the NSSRM will recalculate the appropriate gear for the sender context based on available resources and the security condition. Upon determining the appropriate gear, the SARM will call the setSenderGear function within the PF_KEY module.
5. PF_KEY public functions
setPartialReceiverVerification
• Called by: SARM
• Inputs: gearReceiverVerificationValueStructure, contextHandle
• Output: none
• Description: Based on a number of conditions, a receiver SARM will call PF_KEY to set the partial verification values for all the gears of a gear suite corresponding to a given connection.
setSenderGear
• Called by: SARM
• Inputs: gearInfo, contextHandle
• Output: none
• Description: Based on a number of conditions, a sender SARM will call PF_KEY to set the gear that IPsec should apply when generating the sender authentication tag.

What is claimed is:

1. A method for detecting errors in a message comprising:
receiving at least one message data word and an authentication tag, said authentication tag produced from said at least one message data word according to a nested message authentication code having a reversible inner function;
processing said received at least one message data word according to said nested message authentication code to produce an authentication tag;
determining whether said produced authentication tag is the same as said received authentication tag;
wherein said receiving comprises receiving at least one message data word, an authentication tag, and an intermediate result from said reversible inner function.

2. The method of claim 1, wherein said receiving comprises receiving an encrypted intermediate result from said reversible inner function.

3. The method of claim 2, further comprising decrypting said encrypted intermediate result if said produced authentication tag is not the same as said received authentication tag.

4. The method of claim 2, wherein said processing comprises processing said received at least one message data word according to said nested message authentication code to produce an authentication tag and an intermediate result from said reversible inner function.

5. The method of claim 4, further comprising determining whether said decrypted intermediate result is the same as said produced intermediate result.

6. The method of claim 5, further comprising correcting an erroneous message data word if said decrypted intermediate result is not the same as said produced intermediate result.

7. The method of claim 5, wherein said correcting comprises identifying said erroneous message data word using a reverse inner function corresponding to said reversible inner function.

8. A system for detecting errors in a message comprising:
means for receiving at least one message data word and an authentication tag, said authentication tag produced from said at least one message data word according to a nested message authentication code having a reversible inner function;
means for processing said received at least one message data word according to said nested message authentication code to produce an authentication tag;
means for determining whether said produced authentication tag is the same as said received authentication tag;
wherein said receiving comprises receiving at least one message data word, an authentication tag, and an intermediate result from said reversible inner function.

9. The system of claim 8, wherein said receiving comprises receiving an encrypted intermediate result from said reversible inner function.

10. The system of claim 9, further comprising means for decrypting said encrypted intermediate result if said produced authentication tag is not the same as said received authentication tag.

11. The system of claim 9, wherein said processing comprises processing said received at least one message data word according to said nested message authentication code to produce an authentication tag and an intermediate result from said reversible inner function.

12. The system of claim 11, further comprising means for determining whether said decrypted intermediate result is the same as said produced intermediate result.

13. The system of claim 12, further comprising means for correcting an erroneous message data word if said decrypted intermediate result is not the same as said produced intermediate result.

14. The system of claim 12, wherein said correcting comprises identifying said erroneous message data word using a reverse inner function corresponding to said reversible inner function.

15. A computer program product embodied on a computer readable medium for detecting errors in a message comprising:
  computer code for receiving at least one message data word and an authentication tag, said authentication tag produced from said at least one message data word according to a nested message authentication code having a reversible inner function;
  computer code for processing said received at least one message data word according to said nested message authentication code to produce an authentication tag;
  computer code for determining whether said produced authentication tag is the same as said received authentication tag;
  wherein said receiving comprises receiving at least one message data word, an authentication tag, and an intermediate result from said reversible inner function.

16. The computer program product of claim 15, wherein said receiving comprises receiving an encrypted intermediate result from said reversible inner function.

17. The computer program product of claim 16, further comprising computer code for decrypting said encrypted intermediate result if said produced authentication tag is not the same as said received authentication tag.

18. The computer program product of claim 16, wherein said processing comprises processing said received at least one message data word according to said nested message authentication code to produce an authentication tag and an intermediate result from said reversible inner function.

19. The computer program product of claim 18, further comprising computer code for determining whether said decrypted intermediate result is the same as said produced intermediate result.

20. The computer program product of claim 19, further comprising computer code for correcting an erroneous message data word if said decrypted intermediate result is not the same as said produced intermediate result.

21. The computer program product of claim 19, wherein said correcting comprises identifying said erroneous message data word using a reverse inner function corresponding to said reversible inner function.

* * * * *